(12) United States Patent
Mukai et al.

(10) Patent No.: US 9,070,941 B2
(45) Date of Patent: Jun. 30, 2015

(54) NEGATIVE ELECTRODE MATERIAL FOR LITHIUM SECONDARY BATTERY AND ITS MANUFACTURING METHOD, AND NEGATIVE ELECTRODE FOR LITHIUM SECONDARY BATTERY, AND LITHIUM SECONDARY BATTERY

(75) Inventors: Takashi Mukai, Osaka (JP); Taichi Sakamoto, Osaka (JP); Tetsuo Sakai, Osaka (JP); Kunihiko Tani, Osaka (JP); Naoto Yamashita, Osaka (JP); Koichiro Ikeda, Osaka (JP)

(73) Assignees: National Institute of Advanced Industrial Science and Technology, Tokyo (JP); Isuzu Glass Company, Ltd., Osaka (JP)

( * ) Notice: Subject to any disclaimer, the term of this patent is extended or adjusted under 35 U.S.C. 154(b) by 0 days.

(21) Appl. No.: 13/391,811

(22) PCT Filed: Dec. 9, 2011

(86) PCT No.: PCT/JP2011/078622
§ 371 (c)(1),
(2), (4) Date: May 14, 2012

(87) PCT Pub. No.: WO2012/117638
PCT Pub. Date: Sep. 7, 2012

(65) Prior Publication Data
US 2014/0054492 A1 Feb. 27, 2014

(30) Foreign Application Priority Data

Mar. 2, 2011 (JP) .................................. 2011-045698
Apr. 27, 2011 (JP) .................................. 2011-100039

(51) Int. Cl.
*H01M 6/18* (2006.01)
*H01M 4/36* (2006.01)
(Continued)

(52) U.S. Cl.
CPC .............. *H01M 4/366* (2013.01); *H01M 4/136* (2013.01); *H01M 4/1397* (2013.01);
(Continued)

(58) Field of Classification Search
None
See application file for complete search history.

(56) References Cited

U.S. PATENT DOCUMENTS

2010/0112456 A1* 5/2010 Kimura et al. ................. 429/304
2012/0216394 A1* 8/2012 Kitaura et al. ............... 29/623.2

FOREIGN PATENT DOCUMENTS

EP 2131421 12/2009
EP 2383829 11/2011
(Continued)

OTHER PUBLICATIONS

Hayashi, A. et al., Formation of superionic crystals from mechanically milled Li2S-P2S5 glasses, Electrochem. Comm. 5(2003) 111-114.
(Continued)

*Primary Examiner* — Necholus Ogden, Jr.

(74) *Attorney, Agent, or Firm* — Dennis A. Bennett

(57) ABSTRACT

[Object] The object is to provide a negative electrode material for a lithium secondary battery, wherein a sulfide-based negative electrode with water-resistant properties can exert excellent cycle characteristics and high output performance while maintaining a high discharge capacity and there is no precipitation of lithium dendrites during charge at low temperature.
[Means for Solving Problems] A negative electrode material for a lithium secondary battery comprising sulfur and sulfide glass including the following components (i) and (ii):
(i) at least one or more elements selected from a group consisting of Sb, As, Bi, Ge, Si, Cu, Zn, Pd, In and Zr; and
(ii) at least one or more elements selected from a group consisting of Se, Te, Ga, Sn, Pb, Cd, Al, Fe, Mg, Ca, Co, Ag, Sr, P and Ba,
wherein the ratio of the above components is sulfur: 40-80 mol %, (i): 1-50 mol % and (ii): 1-50 mol %, respectively.

34 Claims, 12 Drawing Sheets

(51) Int. Cl.
*H01M 4/136* (2010.01)
*H01M 4/1397* (2010.01)
*H01M 4/58* (2010.01)
*H01M 4/62* (2006.01)
*H01M 10/0525* (2010.01)
*H01M 4/66* (2006.01)

(52) U.S. Cl.
CPC ........... *H01M 4/364* (2013.01); *H01M 4/5815* (2013.01); *H01M 4/622* (2013.01); *H01M 10/0525* (2013.01); *Y02E 60/122* (2013.01); *Y02T 10/7011* (2013.01); *H01M 4/664* (2013.01)

(56) References Cited

FOREIGN PATENT DOCUMENTS

| | | |
|---|---|---|
| JP | 10-302741 | 11/1998 |
| JP | 2002124254 | 4/2002 |
| JP | 2003-59492 A | 2/2003 |
| JP | 2003059492 | 2/2003 |
| JP | 2003157833 | 5/2003 |
| JP | 2008-103282 A | 5/2008 |
| JP | 2008103282 | 5/2008 |
| JP | 2011028893 | 2/2011 |

OTHER PUBLICATIONS

Morimoto, H. et al., Mechanochemical Synthesis of New Amorphous Materials of 60Li2S-40SiS2 with High Lithium Ion Conductivity, J.Am.Ceram.Soc.82[5] (1999) 1352-54.

Supplementary European Search Report dated Jul. 21, 2014, International Application No. EP 11817497.

2nd Office Action dated Dec. 9, 2014, Chinese Application No. 201180003445X.

* cited by examiner

NEGATIVE ELECTRODE MATERIAL FOR
LITHIUM SECONDARY BATTERY AND ITS
MANUFACTURING METHOD, AND
NEGATIVE ELECTRODE FOR LITHIUM
SECONDARY BATTERY, AND LITHIUM
SECONDARY BATTERY

This application is a National Phase Patent Application of Japanese Patent Application PCT/JP2011/078622, filed Sep. 2, 2011, which claims priority to Japanese Applications No. JP2011-045698, filed Mar. 2, 2011, and No. JP2011-100039, filed Apr. 27, 2011, the disclosures of which are hereby incorporated by reference as if written herein in its entirety.

TECHNICAL FIELD

This invention relates to a negative electrode material for a lithium secondary battery and its manufacturing method, and a negative electrode for a lithium secondary battery, and a lithium secondary battery.

Lithium secondary batteries such as lithium ion batteries and lithium polymer batteries not only have high voltage and high capacity but also are light in weight compared to nickel cadmium batteries and nickel hydrogen batteries. In recent years, therefore, they are more widely used as main power sources for mobile communication equipment, portable electronic devices, electric bicycles, electric two-wheel vehicles, electric automobiles, etc.

At present, graphite negative electrode materials are generally used as negative electrode active substances (negative electrode materials) for these lithium secondary batteries. However, the theoretical capacity of lithium secondary batteries using graphite negative electrode materials is only 372 mAh/g at maximum, and the lithium secondary battery with higher capacities has been desired. Furthermore, there was a problem that if graphite was charged under a low temperature atmosphere lithium dendrites were precipitated.

On the other hand, if lithium metal (Li) is used as a negative electrode material for a lithium secondary battery, a high theoretical capacity can be achieved (for example, see Patent Literature 1). However, there is a major disadvantage with lithium metal in that even at normal temperature dendrites are precipitated on the negative electrode during charge, and after repeated charge and discharge they reach the positive electrode side, thus causing a phenomenon of internal short circuit. Furthermore, precipitated dendrites have a high lability due to their large specific surface area, and since interfacial membranes consisting of solvent degradation products without electron conductivity are formed on the surface the charge and discharge efficiency is lowered due to the high internal resistance of the battery. For these reasons, lithium secondary batteries using lithium metal (hereinafter also referred to as 'Li') have disadvantages of low reliability and short cycle life, and therefore they have not yet reached the stage of wide practical application.

From this background, negative electrode materials comprising other materials than Li and causing no internal short circuit has been desired. For example, elements such as tin and silicon or their nitride, oxide etc. can form Li and alloy to absorb Li. Furthermore, it is known that their amount of Li absorption shows much higher values than that of carbon. Consequently, a variety of alloy negative electrodes including the above-mentioned substances has been proposed.

However, elements such as tin and silicon can increase their volume up to about four times as a result of lithium absorption and release caused during charge and discharge, thus causing electrodes themselves to fall apart.

As a method for solving this problem, an electrode which has thin Sn films formed on the surface of a copper current collector is being proposed (for example, see Patent Literature 2). The cycle characteristics are improved by this method, but the method has the problems of the increased cycle deterioration and reduced input-output characteristics, while the initial capacity is increased, if the Sn film layer is thickened to achieve a capacity per unit area of 1.5 mAh/cm$^2$ or more.

On the other hand, what is being proposed is an electrode using a negative electrode material composed of a composite powder including a first material that can form lithium and a compound easily and a second material that cannot form lithium and a compound easily (for example, refer to Patent Literature 3). More specifically, this electrode uses at least one material selected from 1) tin, silicon, aluminum and silver and 2) a compound including one of these substances or two or more of them as the first material and uses at least one material selected from 1) copper, nickel and cobalt and 2) a compound including one of these substances or two or more of them as the second material. The cycle characteristics are greatly improved by this method, but the capacity is reduced gradually after 50 cycles and the capacity is less than 200 mAh/g after 100 cycles.

Since lithium ion batteries currently commercially available use flammable organic solvents as electrolytic solution, safety measures are indispensable to protect against not only liquid leakage but also short circuit and overcharge. As a result, all-solid lithium ion batteries using solid electrolytes such as ion conducting polymers and ceramics have been developed to enhance safety. Particularly, since sulfides have high lithium ion conductivity, they have drawn attention as ceramics that can be used as lithium ion conducting solid electrolytes, and many related developments has been taking place.

For example, the use of Li—P—S-based solid electrolytes as lithium sulfide-based solid electrolytes is under consideration (see Nonpatent Literature 1). These lithium sulfide-based solid electrolytes greatly increase inductivity as they are amorphousized, and it is known that the high inductivity of $10^{-4}$ S/cm order or more can be achieved. Therefore, these electrolytes have been amorphousized through mechanical milling treatment using planet type ball mills. However, these lithium sulfide-based solid electrolytes react easily with moisture in the air to produce hydroxides or oxides, and since these oxides have very low ionic conductivity they greatly reduce the ionic conductivity of the solid electrolytes. Particularly, most sulfides are difficult to deal with because when reacting with moisture they generate poisonous hydrogen sulfide gas.

Concerning conventional liquid lithium ion batteries, since their electrolytes were in liquid form and the electrolytic solution easily penetrated into active substance layers, ionic conductivity was obtained without much difficulty. However, when solid electrolytes were used, they needed to be previously included in negative electrode active substance layers.

As described above, because sulfide-based solid electrolytes react easily with moisture, water-based binders such as SBR, CMC and PTFE cannot be used and furthermore they are very costly due to each manufacturing process under a dry atmosphere.

PATENT LITERATURE

Japanese Unexamined Patent Publication No. Hei 10-302741;
Japanese Unexamined Patent Publication No. 2003-157833;
Japanese Unexamined Patent Publication No. 2002-124254;
A. Hayashi et al., Electrochem. Comm 5 (2003) 111; and
H. Morimoto et al., J. Am. Ceram. Soc. 82[5] (1999) 1352

SUMMARY OF INVENTION

This invention has been made in consideration of the above situation of the prior art and has for its principal object to provide a negative electrode material for a lithium secondary battery and its manufacturing method, and a negative electrode for a lithium secondary battery, and a lithium secondary battery, wherein a sulfide-based negative electrode has water-resistant properties, excellent cycle characteristics and high output performance can be exerted while a high discharge capacity is maintained and there is no precipitation of dendrites during charge at low temperature.

The negative electrode material for a lithium secondary battery according to this invention comprises sulfur and sulfide glass including the following components (i) and (ii):
  (i) at least one or more elements selected from a group consisting of Sb, As, Bi, Ge, Si, Cu, Zn, Pd, In and Zr; and
  (ii) at least one or more elements selected from a group consisting of Se, Te, Ga, Sn, Pb, Cd, Al, Fe, Mg, Ca, Co, Ag, Sr, P and Ba,
  wherein the ratio of the above components is sulfur: 40-80 mol %, (1): 1-50 mol % and (ii): 1-50 mol %, respectively.

The negative electrode material for a lithium secondary battery according to this invention makes it possible for sulfide glass to have a high capacity as well as a good cycle life, and to function as a sulfur-based negative electrode active substance with water-resistant properties.

Since vitrified sulfide glass is used, the process of morphousization through mechanical milling etc. can be omitted. Furthermore, the sulfide glass has water- and acid-resistant properties, it does not react easily with water or oxygen. Therefore, the ionic conductivity is never reduced, and the sulfide glass is easy to deal with. In addition, since a water-based binder can be used together, each manufacturing process need not be arranged under a dry atmosphere, and the manufacturing costs can be reduced.

Preferably, the above-mentioned sulfide glass includes 0.5-40 mol % of Ge.

Because Ge serves to form a glass framework, a vitrified negative electrode material can certainly be obtained.

The negative electrode material for a lithium secondary battery according to this invention may be a composite powder of the following component A and component B:
  (1) Component A: a material capable of electrochemically absorbing lithium; and
  (2) Component B: the above-described sulfide glass.

The concept of 'composite' used herein is different from that of 'mixed', and while a mixed powder is a mere mixture of the powder that is component A and the powder that is component B, a composite powder includes both component A and component B in each one of the particles making up the powder.

The above-described composite powder is preferably a composite powder with component B coated on the surface of component A. The existence of component B around the circumference (surface) of component A as the nucleus can not only enhance the ionic conductivity of component A during absorption and release (charge and discharge) of lithium but also control cracks caused by expansion and contraction. Consequently, since an active substance, which with only component A has poor ionic conductivity and poor cycle life, can enhance the ionic conductivity and cycle characteristics, even an active substance with poor conductive properties or with high capacity (large volume expansion) improves its cycle life properties.

Regarding the ratio of component A and component B of all the above-described composite powder, preferably component A is 5-80 mass % and component B is 95-20 mass %, given that the total amount of both is 100 mass %.

By adjusting the ratio of component A and component B in this range, it is possible to obtain a long life negative electrode with excellent cycle life properties and a high capacity negative electrode with a very high capacity per weight of an active substance.

Furthermore, component A and component B may exist as the main component phase in the above composite powder, and a very small amount of impurities can also exist therein. The existence of a very small amount of impurities does not adversely affect the cycle deterioration.

The negative electrode for a lithium secondary battery in accordance with this invention is a negative electrode for a lithium secondary battery which uses the above-described negative electrode material for a lithium secondary battery.

Therefore, it is a negative electrode for a lithium secondary battery which has a long life and high charge and discharge capacity and is easy to deal with.

Regarding the negative electrode for a lithium secondary battery according to this invention, since the negative electrode material comprises sulfide glass with water-resistant properties, a water-based binder can be used.

Preferably, the negative electrode for a lithium secondary battery according to this invention includes a polyimide binder. By using a polyimide binder, the binding can be maintained even if the volume expansion is large during charge and discharge.

The lithium secondary battery in accordance with this invention is a lithium secondary battery using the above-described negative electrode for a lithium secondary battery.

Therefore it is a lithium secondary battery with a high capacity, good cycle life properties and excellent water-resistant properties.

The manufacturing method of the negative electrode material for a lithium secondary battery according to this invention comprises:
  (A) a process of obtaining component B by preparing the material of component B above and by vitrifying the prepared material through heat treatment (temperature: 400-1100° and treatment time: 1-30 hours); and
  (B) a process of making a composite of above component A and above component B.

According to this method, it is possible to obtain sufficiently vitrified component B in process (A), and then by making a composite of sufficiently vitrified component B and component A in process (B) it is possible to obtain a negative electrode for a lithium secondary battery which has a long life and high charge and discharge capacity and therefore is easy to deal with.

Preferably, the above-described process (B) is a process of making a composite of component A and component B through mechanical milling.

Since component B has low mechanical strength compared to component A, component B is easier to be crushed than component A. Therefore, the powder of component B finegrained through mechanical milling can be pressure-bonded on the surface of the powder of component A using a ball, etc. to coat component B on component A.

The above-described process (B) can be a process of dispersing component A in melted component B and crushing it after cooling.

If the quantity of component B is smaller than that of component A, it is difficult to coat component B on component A, but it is certainly possible to coat component B on component A by adopting the method of dispersing component A in melted component B and crushing it after cooling.

Preferably, a conductive aid and/or a binder is used in above-described process (A) and/or process (B), and the conductive aid and/or the binder is included in the composite powder.

By including a conductive aid in the composite powder, it is possible to enhance the conductivity of the obtained negative electrode material for a lithium secondary battery and to greatly enhance the cycle life characteristics and high rate discharge characteristics of a battery.

EFFECTS OF INVENTION

According to this invention, it is possible to provide a negative electrode material for a lithium secondary battery and its manufacturing method, and a negative electrode for a lithium secondary battery, and a lithium secondary battery, wherein they have water-resistant properties and are easy to deal with, and can exert excellent cycle characteristics and high output performance while maintaining a high discharge capacity, and there is no precipitation of dendrites during charge at low temperature.

Figure 1:
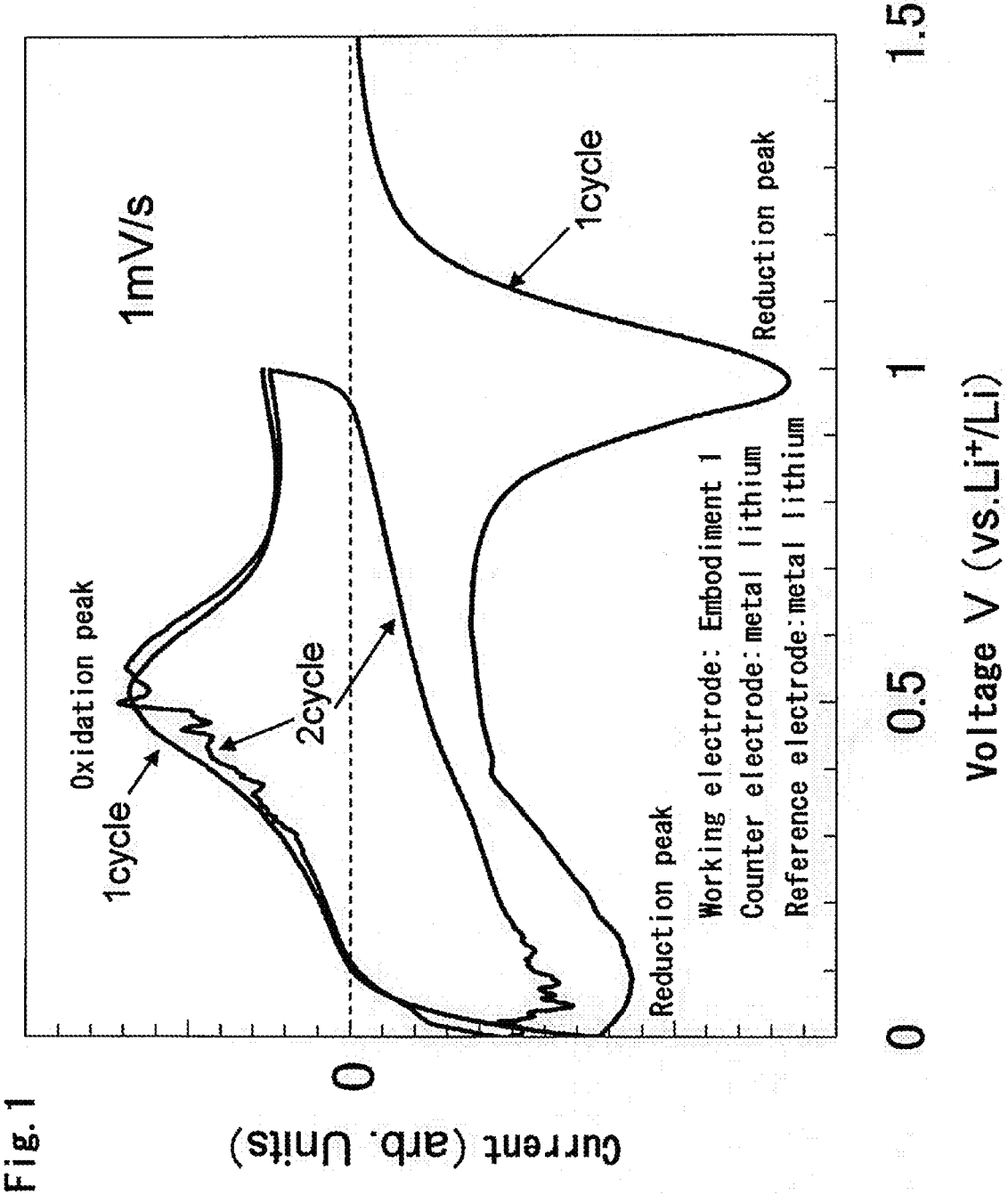
FIG. 1 It is a graph showing the CV measurement results of Embodiment 1.

The embodiments of a negative electrode material for a lithium secondary battery and its manufacturing method, and a negative electrode for a lithium secondary battery, and a lithium secondary battery in accordance with this invention are described below.

The negative electrode material for a lithium secondary battery (lithium ion secondary battery) according to this invention comprises:
  sulfur and sulfide glass including the following components of (i) and (ii):
    (i) at least one or more elements selected from a group consisting of Sb, As, Bi, Ge, Si, Cu, Zn, Pd, In and Zr; and
    (ii) at least one or more elements selected from a group consisting of Se, Te, Ga, Sn, Pb, Cd, Al, Fe, Mg, Ca, Co, Ag, Sr, P and Ba,
  wherein the ratio of the above components is sulfur: 40-80 mol %, (1): 1-50 mol % and (ii) 1-50 mol %, respectively.

The above-described sulfide glass has water-resistant properties and changes into at least lithium sulfide ($Li_2S$) during the process of initial charge (lithium ion absorption) and does not react during subsequent processes of charge and discharge. That is, it is reduced by lithium and decomposed into at least a solid electrolyte layer.

For example, SiO forms lithium orthosilicate ($Li_4SiO_4$) which is a solid electrolyte during the process of initial charge. However, lithium orthosilicate has poor ionic conductivity and high output discharge is difficult.

On the other hand, the above-described sulfide glass is decomposed into a lithium sulfide ($Li_2S$)-based solid electrolyte during the process of initial charge. A lithium sulfide ($Li_2S$)-based solid electrolyte layer is a solid body that can transport lithium ion during the process of absorption and release of lithium ion.

Therefore, the negative electrode material for a lithium secondary battery in accordance with this invention is decomposed into a lithium sulfide ($Li_2S$)-based solid electrolyte with good ionic conductivity and can discharge high output during the process of initial charge.

The negative electrode material for a lithium secondary battery in accordance with this invention may comprise:
  the above-described component (i) comprising at least one or more elements selected from a group consisting of Sb, Bi, Ge, Cu and Zn;
  the above-described component (ii) consisting of Sn.

The negative electrode material for a lithium secondary battery in accordance with this invention may comprise:
  the above-described component (i) consisting of Ge; and
  the above-described component (ii) comprising at least one or more elements selected from a group consisting of Te, Ga, Sn, Al, Mg, Ca, Sr, P and Ba.

That is to say, in this invention, it is preferable that at least either Ge included in the above component (i) or Sn included in the above component (ii) is an indispensable element. This makes it possible to obtain excellent battery characteristics.

Concerning each component of the sulfide glass constituting the negative electrode material for a lithium secondary battery according to this invention, sulfur is an indispensable element for forming lithium sulfide during initial charge, (i) serves to form the glass framework and (ii) serves to make the glass easy to form and to absorb and release lithium.

Sulfur is 40-80 mol % not only because if it is less than 40 mol % an electrode with reduced amount of a lithium sulfide-based solid electrolyte that can be formed and with poor ionic conductivity or an electrode with reduced amount of a buffer layer absorbing volume expansion of (ii) during charge and discharge and with poor cycle life characteristics will be formed, but also because if it is more than 80 mol % an electrode which is difficult to be vitrified or an electrode with lower negative electrode capacity due to reduced amount of (ii) will be formed, neither of which is preferable. Sulfur is more preferably 30-70 mol % and even more preferably 35-65 mol %.

(i) is 1-50 mol % not only because if it is less than 1 mol % a crystallized negative electrode without water-resistant properties will result from a small quantity of (i) forming the glass framework, but also because if it is more than 50 mol % an electrode with low negative electrode capacity will result from a small quantity of (ii). Neither case is preferable, and (i) is more preferably 5-40 mol % and even more preferably 10-35 mol %.

(ii) is 1-50 mol % not only because if it is less than 1 mol % an electrode with low negative electrode capacity will be formed, but also because if it is more than 50 mol % an electrode with reduced amount of a lithium sulfide-based solid electrolyte that can be formed due to reduced amount of sulfur and (i) and with poor ionic conductivity or an electrode with reduced amount of a buffer layer absorbing volume expansion of (ii) during charge and discharge and with poor cycle life characteristics will be formed, neither of which is preferable. (ii) is more preferably 5-45 mol % and even more preferably 10-40 mol %.

Preferably, the sulfide glass constituting the negative electrode material for a lithium secondary battery according to this invention includes Ge in terms of vitrification. Ge serves to form the glass framework.

The content of Ge is preferably 0.5-40 mol % and more preferably 1-20 mol %.

If the content of Ge is less than 0.5 mol %, vitrification is likely to be insufficient. If it is more than 40 mol %, an electrode with low negative electrode capacity will result from a small quantity of (ii), and this electrode will be costly because Ge is an expensive element. Therefore, neither case is preferable.

As the above-described sulfide glass, a composite of two or more kinds of sulfide glass may be used.

A manufacturing method of the sulfide glass constituting the negative electrode material for a lithium secondary battery according to this invention is not particularly limited, but for example it can be manufactured by sealing a specified amount of the material of each component in a quartz ample and vitrifying the sealed content through heat treatment.

As the material, in addition to sulfur (S), a single metal such as Sb, Bi, Ge, Si, Cu, Zn, Se, Te, Ga, Sn, Pb, Cd, Al, Fe, Mg, Ca, Co, Ag, Sr, Ba and In, a sulfide of any of these elements, (for example, $Ag_2S$, $Al_2S_3$, BIS, $Bi_2S_3$, $Fe_2S_3$, GaS, $In_2S_3$, MgS, $Sb_2S_3$, $Sb_2S_5$, SnS, $SnS_2$, $ZrS_2$, GeS, $GeS_2$, and ZnS) or a nonmetal such as As and P can be used.

The above-mentioned materials are used with sulfur which is a requisite element, and in addition a combination of above (i) and (ii) is used.

When the sulfide glass is manufactured by the above-described manufacturing method, preferably the inside of the quartz ample used is sufficiently dried using a vacuum dryer. Furthermore, during vitrification, it is heated preferably at 400-1100° C. and more preferably at 600-800° C. The heat treatment time may be long enough to vitrify the content sealed in the quartz ample and generally it is preferably 1-30 hours and more preferably 5-24 hours. The above-mentioned content can be sufficiently vitrified by heating treatment at 400-1100° C. for 1-30 hours.

Since the sulfide glass constituting the negative electrode material for a lithium secondary battery in accordance with this invention has excellent water-resistant properties, the handling of the sulfide glass in the air and the use of a binder, which were impossible with conventional sulfides, are possible.

Furthermore, the sulfide glass obtained by the above-described method can improve conductive properties by formation of conductive coating with a conductive metal, carbon etc. This enables the glass to improve its battery properties as a negative electrode active substance for a lithium battery.

As a method of forming the coating of a conductive metal, carbon or other conductive element on the sulfide glass, the sputtering method, evaporation method, mechanical alloy (MA) method, rotary kiln method, non-electrolytic plating method or other known art can be used.

A too small quantity of the conductive coating causes the coating not to be effective enough to improve conductive properties, and on the other hand an excessive quantity of the coating is not preferable because almost all the surface of the sulfide glass will be coated, rendering absorption and release of lithium ion difficult. Therefore, the quantity of the conductive coating is preferably 0.1-30 weight parts per 100 weight parts of the sulfide glass, more preferably 0.5-25 weight parts and even more preferably 1-10 weight parts.

Particularly, the method of forming the coating of carbon by mixing the above-described sulfide glass with a carbon precursor and then by heating it under a non-oxidizing atmosphere is advantageous in that the coating of carbon with excellent uniformity can be easily formed without using a large scale apparatus.

A carbon precursor used in this method may be an organic material that can be carbonized by heating, and for example a hydrocarbon-based organic substance with adhesive properties, coal-based pitch, petroleum-based pitch and other substance can be used. Among them, as a hydrocarbon-based organic substance with adhesive properties, for example, phenol resin, furan resin, citric acid, PVA and urushiol can be exemplified. One of these carbon precursors can be used singly or two or more of them can be mixed.

The heating temperature can be high enough to carbonize a carbon precursor, and for example it is preferably around 300-1100° C. and more preferably 500-900° C. In this case, a too low heating temperature (less than 300° C.) makes it difficult for a carbon precursor to be carbonized, and on the other hand a too high heating temperature (more than 1100° C.) is not preferable not only because carbon sulfide, etc. could be generated due to reaction of the sulfide glass with carbon but also because it is costly due to use of a large scale apparatus.

The heat treatment time may be long enough to carbonize a carbon precursor, and generally it may be about 1-24 hours. A too short heating time is not preferable because a negative electrode with poor electronic conductivity is obtained due to insufficient carbonization of a carbon precursor. On the other hand, a too long heating time is not economically preferable due to waste of heating time.

The atmosphere for carbonization treatment may be a non-oxidizing atmosphere such as an inert atmosphere and reductive atmosphere. Specifically, it may be an atmosphere of He (helium), Ne (neon), Ar (argon), $N_2$ (nitrogen), $H_2$ (hydrogen), etc.

Both the above-described sulfide glass and this sulfide glass with the conductive coating formed on it can be used effectively as a negative electrode active substance for a lithium secondary battery.

The negative electrode material for a lithium secondary battery according to this invention may comprise only the above-described sulfide glass, but preferably it is a composite powder of a material capable of electrochemically absorbing and releasing lithium (hereinafter referred to as 'component A') and the above-described sulfide glass (hereinafter referred to as 'component B').

By using this kind of composite powder as a negative electrode material for a lithium secondary battery, an even higher capacity can be achieved.

When the composite power of component A and component B is used as the negative electrode material for a lithium secondary battery according to this invention, it can be manufactured by a manufacturing process comprising the following process (A) and process (B):

(A) a process of preparing the material of component B and obtaining component B by vitrifying the prepared material through heat treatment (temperature: 400-1100° and treatment time: 1-30 hours); and
(B) a process of making a composite of component A and component B.

Regarding the above process (A) and process (B), the above-described manufacturing method of the sulfide glass can be adopted as process (A). As Process (B), a process of making a composite of component A and component B through mechanical milling, a process of dispersing component A in melted component B and crushing it after cooling or other process can be adopted. These processes (B) are described later.

Component A is not particularly limited so long as it can absorb lithium ion during initial charge and can absorb and release lithium ion during subsequent cycles of charge and discharge.

For example, it may be at least one or more elements selected from a group consisting of Li, Na, C, Mg, Al, Si, P, K, Ca, Sc, Ti, V, Cr, Mn, Fe, Co, Ni, Cu, Zn, Ga, Ge, Y, Zr, Nb, Mo, Pd, Ag, Cd, In, Sn, Sb, W, Pb and Bi, an alloy, an oxide, chalcogen compound or halogen compound using any of these elements.

Among these elements, at least one or more elements selected from a group consisting of Li, C, Mg, Al, Si, Ti, Zn, Ge, Ag, In, Sn and Pb, an alloy using any of these elements, an oxide, chalcogen compound and halogen compound are preferable in that the discharge plateau range can include the range of 0-1 V (vs. Li$^+$/Li).

Furthermore, in terms of energy density, Al, Si, Zn, Ge, Ag and Sn are preferable as elements, a combination of Si—Al, Al—Zn, Si—Mg, Al—Ge, Si—Ge, Si—Ag, Si—Sn, Zn—Sn, Ge—Ag, Ge—Sn, Ge—Sb, Ag—Sn, Ag—Ge, Sn—Sb, etc. are preferable as alloys, SiO, SnO, $SnO_2$, $SnC_2O_4$, $Li_4Ti_5O_{12}$, etc. are preferable as oxides, SnS, $SnS_2$, etc. are preferable as chalcogen compounds, and $SnF_2$, $SnCl_2$, $SnI_2$, $SnI_4$, etc. are preferable as halogen compounds.

One kind of above-described component A may be used, and two or more kinds may be used, too.

Concerning the ratio of component A and component B in the composite powder, preferably component A is 5-80 mass % and component B is 95-20 mass %, and more preferably component A is 20-70 mass % and component B is 80-30 mass %, given that the total amount of both is 100 mass %.

For example, given that component A is Si and that component A (Si) is 5-35 mass % and component B is 95-65 mass %, the capacity per weight of an active substance is 500-1500 mAh/g and the cycle life properties are excellent, and this ratio is preferable for a long life negative electrode. On the other hand, given that component A (Si) is 35-80 mass % and component B is 65-20 mass %, the capacity per weight of an active substance is very high, 1500-3500 mAh/g, this ratio is preferable for a high capacity negative electrode.

Furthermore, component A and component B may exist as the main component phase in the above composite powder, and the existence of a very small amount of impurities does not adversely affect the cycle deterioration.

For simplification of description, the case of the use of S—Ge—Sn glass (S: 60 mol %, Ge: 25 mol % and Sn: 15 mol %) as component B is described hereinafter. It is needless to say, however, that component B is not limited to this only.

In the negative electrode material for a lithium secondary battery according to this invention, a solid electrolyte layer is generated first through Li reduction of component B on the surface of component A during the process of initial charge (Li absorption). For example, if component B is S—Ge—Sn glass, it is phase-separated into lithium sulfide-germanium sulfide ($Li_2S$—$SiS_2$) and tin through Li reduction. Since $Li_2S$—$SiS_2$ is not involved as an active substance under the condition of 0-1 V (versus lithium potential), it is not involved in subsequent charge and discharge reactions. Consequently, it exists as the framework of the composite powder, enhances the ionic conductivity of phase-separated Sn or component A involved in charge and discharge reaction, and effectively controls a volume change of the whole composite powder because in spite of any volume change of phase-separated Sn or component A $Li_2S$—$GeS_2$ functions as a buffer layer. On the other hand, if component B is S—Ge—Si—Sn glass, it is phase-separated into lithium sulfide-silicon sulfide-germanium sulfide ($Li_2S$—$GeS_2$—$SiS_2$) and tin through Li reduction. Since $Li_2S$—$GeS_2$—$SiS_2$ is not involved as an active substance under the condition of 0-1 V (vs. Li$^+$/Li), it is not involved in subsequent charge and discharge reactions, either. Consequently, it exists as the framework in the composite powder, enhances the ionic conductivity of phase-separated Sn or component A involved in charge and discharge reaction, and effectively controls a volume change of the whole composite powder in spite of any volume change of phase-separated Sn or component A.

$Li_2S$—$GeS_2$, $Li_2S$—$GeS_2$—$SiS_2$, etc. generated during the process of charge have excellent ionic conductivity. Component A is a metal component which reacts principally with Li, and it has excellent electric conductivity. Therefore, during the process of charge and discharge of the composite powder constituting the negative electrode material for a lithium secondary battery in accordance with this invention, excellent conductivity is obtained in terms of both ionic conductivity and electric conductivity. Component A or phase-separated Sn changes into lithium phase by further absorbing Li and becomes a reversible phase of a capacitance component.

As described above, the negative electrode material for a lithium secondary battery according to this invention, which comprises the above composite powder, has large reversible electric capacity of phase-separated Sn or component A and the framework of irreversible component of $Li_2S$—$GeS_2$ phase, $Li_2S$—$GeS_2$—$SiS_2$ phase or other phase as both a solid electrolyte layer and buffer layer to exhibit excellent characteristics in terms of high output, high capacity, cycle life, etc.

In the composite powder constituting the negative electrode material for a lithium secondary battery according to this invention, preferably component B is coated on the surface of component A.

The reason for it is that with the existence of component B around the nucleus of component A the ionic conductivity of component A is enhanced during absorption and release (charge and discharge) of lithium and cracks caused by expansion and contraction can be controlled. Consequently, since an active substance, which with only component A has poor ionic conductivity and poor cycle life, can enhance the ionic conductivity and cycle characteristics, even an active substance with poor conductive properties or with high capacity (large volume expansion) improves its cycle life properties.

Component A may be a primary particle itself or a condensed secondary particle, etc. Component B may be coated completely on the whole surface of component A or may be coated on only part of component A. If component B is coated on only part of component A, it may be coated on 20% or more of the surface area of component A. In this invention, it is possible to measure the ratio of component A coated by component B by using for example a scanning electron microscope (SEM).

The method of coating component B on the surface of component A is not particularly limited, but for example the method for a mechanical milling treatment by mixing materials including component A and component B can be used.

The mechanical milling treatment is a method applying external force of impact shock, tension, friction, compression, shear, etc. to the material powder (at lease component A and component B), and the method of using a tumbling mill, vibrating mill, planetary mill, oscillating mill, horizontal mill, attritor mill, jet mill, 'Raikai' mill, homogenizer, fluidizer, paint shaker, mixer, etc. can be used.

For example, concerning the method of using a planetary mill, the material powder and a ball are placed in a container, and the material powder can be crushed and mixed or subjected to solid-phase reaction using mechanical energy generated through rotation and revolution. It is known that this method can crush the powder into nano-order particles.

In this invention, the material powder of a negative electrode material includes at least component A and component B. Since component B has low mechanical strength compared to component A, component B is easier to be crushed than component A. Therefore component B can be coated on component A after the microparticulated powder of component B is pressure-bonded on the powder surface of component A by means of a ball, etc.

As another method of coating component B on the surface of component A, the method of dispersing component A in melted component B and then crushing it after cooling can be used.

If the quantity of component B is smaller than that of component A, it is difficult to coat component B on component A by means of the above-described mechanical milling treatment, and therefore the adoption of this method (the method of dispersing component A in melted component B and then crushing it after cooling) is preferable.

The conditions for melting component B are not particularly limited, but component B is not easily melted at the heating temperature of less than 400° C. and it is likely to be decomposed at the temperature of more than 1100° C. Therefore, the heating temperature is preferably around 400-1100° C. and more preferably 500-900° C.

Furthermore, when component B is coated (that is, during the above process (B)), a conductive aid may be included in component B. As a method for it, a conductive aid may be dispersed in the melted state of component B. By including a conductive aid in component B, its conductivity can be improved, and the cycle life properties of a battery and the high rate discharge characteristics can be substantially improved.

In addition, a conductive aid may be included in component B during the above-described process (A), and a conductive aid may also be included in component B during both process (A) and process (B).

A conductive aid is not particularly limited, but since a metal, conductive polymer, etc. is likely to react with component B, preferably carbon black is used. As a carbon black, acetylene black (AB), ketjen black (KB), carbon fiber (VGCF), carbon nanotube (CNT), graphite, soft carbon, hard carbon, etc. can be used. Furthermore, since the temperature of component B is high during melting, a carbon precursor may be used as a conductive aid. Given that component B is 100 wt %, the content of a conductive aid included is preferably 0.1-10 wt % and more preferably 0.5-5 wt %. When the content is 0.1-10 wt %, sufficient effect of improving conductivity is achieved, high rate discharge characteristics can be enhanced, and capacity reduction as a result of the removal of component B from component A can be minimized. Among the above-mentioned conductive aids, if a conductive aid with high cohesive properties such as carbon black is used, preferably the conductive aid is dispersed by a stirrer, ultrasonic waves or other means.

A lithium secondary battery using the above-mentioned composite powder as a negative electrode material for a lithium battery has high capacity, good cycle life properties and excellent water-resistant properties.

In addition to the above-mentioned composite powder, the above-described sulfide glass or a sulfide glass with a conductive coating formed on it can also be used as an effective negative electrode material for a lithium secondary battery.

The use of the negative electrode material according to this invention and the adhesive formation on a power collector enable the negative electrode for a lithium secondary battery to function well.

Adhesive formation means fixing a power collector and the negative electrode material according to this invention in a contact condition. That is, it means filling the negative electrode material or fixing the negative electrode material with a power collector such as a metal net. The method of adhesive formation is not particularly limited, but for example, a pressure bonding method, slurry method, paste method, electrophoretic method, dipping method, spin coat method or aerosol deposition method can be adopted. Particularly, if a metal foam such as foamed nickel is used as a power collector, a slurry method or paste method is preferable in terms of the filling density, speed of manufacturing an electrode, etc.

For example, in addition to the negative electrode material according to this invention, a conductive aid for adding conductivity or a binder for adding cohesive properties may be included in a negative electrode, if necessary.

Furthermore, in manufacturing the negative electrode material according to this invention, a conductive aid, binder, etc. can be included in component B by adding the conductive aid, binder etc. during the above-described process (A) and/or process (B), but even in this case, a conductive aid, binder, etc may be included in manufacturing the negative electrode using the negative electrode material. For example, a paste composition of the negative electrode mixture, negative electrode mixture slurry, etc., which is obtained by adding an appropriate solution (such as N-methyl-2-pyrrolidone (NMP), water, alcohol, xylene and toluene) to a mixture including the above-described negative electrode material as well as a conductive aid, binder, etc. (negative electrode mixture) and then by kneading it sufficiently, can be applied, dried, and then pressed on the surface of a power collector to form a layer including the negative electrode material on the surface and use it as a negative electrode.

In order to prepare a lithium secondary battery with this negative electrode, a horn-shaped, cylinder-shaped, coin-shaped or other-shaped lithium secondary battery may be assembled using known battery elements (such as a positive electrode, separator and electrolytic solution) of a lithium secondary battery and in accordance with a general method.

As a conductive aid, a generally used aid, for example any of the above-mentioned aids may be used, and if a carbon material is included in the aid, the type (structure, etc.) of the carbon material is not particularly limited. For example, a carbon material such as acetylene black (AB), ketjen black (KB), graphite, carbon fiber, carbon tube or amorphous carbon may be used singly or a combination of two or more of them may be used. More preferably, a material capable of forming a three-dimensional conductive mesh structure (for example, a conductive material in a flake form (such as flake copper powder and flake nickel powder), carbon fiber, carbon tube and amorphous carbon) in the composite powder is used. With the formation of a three-dimensional conductive mesh structure, sufficient power can be collected for a negative electrode material for a lithium secondary battery, and volume expansion of an electrode (particularly an alloy component) can be effectively controlled during absorption of Li.

As a binder, a generally used material, such as polyvinylidene fluoride (PVdF), polytetrafluoroethylene (PTFE), polyimide (PI), polyamide, polyamide-imide, polyacryl, styrene-butadiene rubber (SBR), styrene-ethylene-buthylene-styrene copolymer (SEBS) or carboxymethylcellulose (CMC), may be used singly or a combination of two or more of them may be used. However, if the content of an active substance used to make a composite with component A exceeds 1000 mAh/g, volume expansion is very large during charge and discharge, and therefore it is preferable to use PI as a binder.

For example, in a negative electrode layer including a negative electrode material, preferably, the negative electrode material according to this invention is 50-99 mass %, the content of a conductive aid is 0.5-40 mass %, and the content of a binder is 0.5-30 mass %.

The thickness of a negative electrode layer including a negative electrode material depends on electrode capacity density, but for example it is preferably 0.5-200 μm. With the thickness of a layer including a negative electrode material in this range, an electric capacity suitable for practical use can be obtained while the negative electrode material is supported by a power collector.

The electrode capacity density is preferably 0.1-30 mAh/cm². For example, if the negative electrode according to this invention is obtained with the electrode capacity density of 0.1-3 mAh/cm², it is suitable for the application of ultra-high output, if the negative electrode is obtained with the electrode capacity density of 0.5-5 mAh/cm², it is suitable for the purposes of long life or high output, and if the negative electrode is obtained with the electrode capacity density of 3-30 mAh/cm², it is suitable for the purpose of high capacity. Furthermore, the electrode capacity density can be measured by for example testing a charge and discharge cycle capacity, and it may also be calculated by dividing by the electrode area the value of capacity obtained based on the weight of an applied active substance.

A power collector is not particularly limited so long as it is a material with electronic conductivity that can be conducted through a retained negative electrode material. For example, a conductive substance such as C, Ti, Cr, Ni, Mo, Ru, Rh, Ta, W, Os, Ir, Pt and Au and an alloy including two or more of these conductive substances (for example, stainless steel) can be used. As a power collector, C, Ti, Cr, Ni, Cu, Au, stainless steel, etc. is preferable in terms of high electric conductivity and high stability in electrolytic liquid, and C, Ni, Cu, stainless steel, etc. is preferable in terms of low material cost. A power collector is configured in a line, stick, plate, foil, net, woven cloth, nonwoven cloth, expanded form, porous body or foam, and among them an expanded form, porous body or foam is preferable in terms of high filling density and good output characteristics.

As a positive electrode, any conventional material such as lithium cobalt oxide ($LiCoO_2$), lithium nickel oxide ($LiNiO_2$), lithium cobalt manganese nickel oxide ($LiCo_{0.33}Ni_{0.33}Mn_{0.33}O_2$), lithium manganese oxide ($LiMn_2O_4$), lithium iron phosphate ($LiFePO_4$), a vanadium oxide-based material and a sulfur-based material is used.

As a separator, any separator used for a known lithium secondary battery can be used. For example, a porous sheet comprising resin such as polyethylene (PE), polypropylene (PP), polyester, cellulose and polyamide, glass filter, nonwoven cloth, etc. can be used, but not limited to them.

Since an electrolyte needs to include lithium ion, it is not particularly limited so long as it is used for a lithium secondary battery, but lithium salt is preferable as an electrolytic salt. As this lithium salt, specifically, at least one kind selected from a group consisting of lithium hexafluorophosphate, lithium perchlorate, lithium tetrafluoroborate, lithium trifluoromethanesulfonate and lithium imide trifluoromethanesulfonate can be used. The above-mentioned lithium salts, which have excellent charge and discharge cycle characteristics due to high electronegativity and easy ionization, can enhance the charge and discharge capacity of a secondary battery.

As a solvent for the above-described electrolyte, at least one kind selected from a group consisting of propylene carbonate (PC), ethylene carbonate (EC), dimethyl carbonate (DMC), diethyl carbonate (DEC), γ-butyrolactone, 2-methyltetrahydrofuran, 1,3-dioxolan, 4-methyl-1,3-dioxolan, 1,2-dimethoxyethane, 1,2-diethoxyethane, diethyl ether, sulfolane, methyl sulfolane, nitromethane, N,N-dimethylformamide and dimethylsulfoxide can be used, and particularly a single body of propylene carbonate, a mixture of ethylene carbonate and diethyl carbonate or a single body of γ-butyrolactone is preferable. Concerning the mixing ratio of a mixture of ethylene carbonate and diethyl carbonate described above, both ethylene carbonate and diethyl carbonate can be adjusted within the range of 10-90 volume %.

Alternatively, a solid electrolyte may be used instead of a solvent.

A lithium secondary battery of the above-described structure functions as a secondary battery.

This invention is described in detail below with reference to embodiments, but this invention is not limited to these embodiments.

Manufacture of Sulfide Glass

Materials for sulfide glass were prepared according to the compositions shown in Table 1 below, and sulfides 1-39 were obtained by melting the prepared materials through heat treatment and then by cooling them to room temperature. As a heat treatment condition, the prepared materials were heated up to the specified temperature at the heating speed of 20° C./hour and then retained at the same temperature for 12 hours.

Obtained sulfides 1-39, their compositions and the synthesis conditions are shown in Tables 1 and 2. In Table 2, 'Natural' means cooling naturally to room temperature, and 'Slow cooling' means cooling to room temperature at the cooling speed of 10° C./hour.

Furthermore, in order to confirm whether or not the obtained sulfides were vitrified, the XRD measurement of the sulfides was carried out using an X-ray diffractometers. As a result, sulfides 1-33 were vitrified. On the other hand, sulfides 34-39 were not vitrified but they were crystallized. In Table 2, 'o' was given to the ones which were vitrified and 'x' was given to the ones which were not vitrified.

Sulfides 1-33 were kept for 24 hours in water whose temperature was 40° C. in order to confirm whether or not they were water-resistant. Vitrified sulfides 1-33 showed no special changes. On the other hand, since crystallized sulfides 34-39 formed hydroxide and emitted smell like rotten eggs, it is considered that they reacted with water and generated hydrogen sulfide ($H_2S$).

TABLE 1

| | Composition of Sulfide (mol %) | | | | | | | | | | | | | | | | | |
|---|---|---|---|---|---|---|---|---|---|---|---|---|---|---|---|---|---|---|
| | Sulfur | (i) | | | | | | (ii) | | | | | | | | | | |
| | S | Sb | Ge | Zn | Bi | Cu | Sn | Ga | Fe | Mg | Ca | Co | Ag | P | Ba | Sr | Te | Al |
| Sulfide 1 | 60 | 9 | 16 | — | — | — | 15 | — | — | — | — | — | — | — | — | — | — | — |
| Sulfide 2 | 59 | 12 | 11 | — | — | — | 18 | — | — | — | — | — | — | — | — | — | — | — |
| Sulfide 3 | 59 | 22 | 7 | — | — | — | 11 | — | — | — | — | — | — | — | — | — | — | — |
| Sulfide 4 | 60 | 14 | 13 | — | — | — | 13 | — | — | — | — | — | — | — | — | — | — | — |
| Sulfide 5 | 59 | 12 | 11 | — | — | — | 18 | — | — | — | — | — | — | — | — | — | — | — |
| Sulfide 6 | 59 | 22 | 7 | — | — | — | 11 | — | — | — | — | — | — | — | — | — | — | — |
| Sulfide 7 | 73 | 9 | 9 | 9 | — | — | 9 | — | — | — | — | — | — | — | — | — | — | — |
| Sulfide 8 | 49 | 13 | 10 | 2 | — | — | 2 | — | — | — | — | — | — | — | — | — | — | — |
| Sulfide 9 | 60 | — | 15 | 15 | — | — | 10 | — | — | — | — | — | — | — | — | — | — | — |
| Sulfide 10 | 60 | 4 | 4 | 15 | — | — | 17 | — | — | — | — | — | — | — | — | — | — | — |
| Sulfide 11 | 60 | 9 | 16 | — | — | 1 | 15 | — | — | — | — | — | — | — | — | — | — | — |
| Sulfide 12 | 60 | 8 | 16 | — | — | — | 15 | — | 1 | — | — | — | — | — | — | — | — | — |
| Sulfide 13 | 60 | 6 | 16 | — | 3 | — | 15 | — | — | — | — | — | — | — | — | — | — | — |
| Sulfide 14 | 60 | 9 | 16 | — | — | — | 15 | 2 | — | — | — | — | — | — | — | — | — | — |
| Sulfide 15 | 60 | 9 | 16 | — | — | — | 15 | — | — | 2 | — | — | — | — | — | — | — | — |
| Sulfide 16 | 60 | 9 | 16 | — | — | — | 15 | — | — | — | 2 | — | — | — | — | — | — | — |
| Sulfide 17 | 60 | 9 | 16 | — | — | — | 15 | — | — | — | — | 2 | — | — | — | — | — | — |
| Sulfide 18 | 60 | 9 | 16 | — | — | — | 15 | — | — | — | — | — | 2 | — | — | — | — | — |
| Sulfide 19 | 60 | 9 | 16 | — | — | — | 15 | — | — | — | — | — | — | 2 | — | — | — | — |
| Sulfide 20 | 60 | 9 | 16 | — | — | — | 15 | — | — | — | — | — | — | — | — | 2 | — | — |
| Sulfide 21 | 60 | 9 | 16 | — | — | — | 15 | — | — | — | — | — | — | — | 2 | — | — | — |
| Sulfide 22 | 58 | — | — | — | 33 | — | 8 | — | — | — | — | — | — | — | — | — | — | — |
| Sulfide 23 | 50 | — | — | — | — | 30 | 20 | — | — | — | — | — | — | — | — | — | — | — |
| Sulfide 24 | 50 | — | — | 27 | — | — | 23 | — | — | — | — | — | — | — | — | — | — | — |
| Sulfide 25 | 52 | — | 15 | — | — | — | — | — | — | — | — | — | — | — | — | — | 33 | — |
| Sulfide 26 | 63 | — | 16 | — | — | — | 20 | — | — | — | — | — | — | — | — | — | — | — |
| Sulfide 27 | 63 | — | 12 | — | — | — | — | — | — | 15 | — | — | — | — | — | — | — | — |
| Sulfide 28 | 64 | — | 9 | — | — | — | — | — | — | — | 27 | — | — | — | — | — | — | — |
| Sulfide 29 | 51 | — | 11 | — | — | — | — | — | — | — | — | — | — | 38 | — | — | — | — |
| Sulfide 30 | 62 | — | 25 | — | — | — | — | — | — | — | — | — | — | — | 13 | — | — | — |
| Sulfide 31 | 62 | — | 23 | — | — | — | — | — | — | — | — | — | — | — | — | 15 | — | — |
| Sulfide 32 | 52 | 39 | — | — | — | — | 9 | — | — | — | — | — | — | — | — | — | — | — |
| Sulfide 33 | 63 | — | 16 | — | — | — | — | — | — | — | — | — | — | — | — | — | — | 20 |
| Sulfide 34 | 60 | 9 | 16 | — | — | — | 15 | — | — | — | — | — | — | — | — | — | — | — |
| Sulfide 35 | 60 | — | — | 20 | — | — | 20 | — | — | — | — | — | — | — | — | — | — | — |

TABLE 1-continued

| | Composition of Sulfide (mol %) | | | | | | | | | | | | | | | | |
|---|---|---|---|---|---|---|---|---|---|---|---|---|---|---|---|---|---|
| | Sulfur | (i) | | | | | (ii) | | | | | | | | | | |
| | S | Sb | Ge | Zn | Bi | Cu | Sn | Ga | Fe | Mg | Ca | Co | Ag | P | Ba | Sr | Te | Al |
| Sulfide 36 | 30 | — | 60 | — | — | — | 10 | — | — | — | — | — | — | — | — | — | — | — |
| Sulfide 37 | 30 | 60 | — | — | — | — | 10 | — | — | — | — | — | — | — | — | — | — | — |
| Sulfide 38 | 90 | — | 5 | — | — | — | 5 | — | — | — | — | — | — | — | — | — | — | — |
| Sulfide 39 | 25 | — | 10 | — | — | — | 65 | — | — | — | — | — | — | — | — | — | — | — |

TABLE 2

| | Heating Treatment Temperature | Cooling Method | Vitrification |
|---|---|---|---|
| Sulfide 1 | 750° C. | Natural | o |
| Sulfide 2 | 750° C. | Natural | o |
| Sulfide 3 | 750° C. | Natural | o |
| Sulfide 4 | 750° C. | Natural | o |
| Sulfide 5 | 500° C. | Natural | o |
| Sulfide 6 | 500° C. | Natural | o |
| Sulfide 7 | 760° C. | Natural | o |
| Sulfide 8 | 750° C. | Natural | o |
| Sulfide 9 | 760° C. | Natural | o |
| Sulfide 10 | 750° C. | Natural | o |
| Sulfide 11 | 750° C. | Natural | o |
| Sulfide 12 | 760° C. | Natural | o |
| Sulfide 13 | 760° C. | Natural | o |
| Sulfide 14 | 750° C. | Natural | o |
| Sulfide 15 | 750° C. | Natural | o |
| Sulfide 16 | 750° C. | Natural | o |
| Sulfide 17 | 750° C. | Natural | o |
| Sulfide 18 | 760° C. | Natural | o |
| Sulfide 19 | 750° C. | Natural | o |
| Sulfide 20 | 750° C. | Natural | o |
| Sulfide 21 | 750° C. | Natural | o |
| Sulfide 22 | 750° C. | Natural | o |
| Sulfide 23 | 750° C. | Natural | o |
| Sulfide 24 | 750° C. | Natural | o |
| Sulfide 25 | 750° C. | Natural | o |
| Sulfide 26 | 750° C. | Natural | o |
| Sulfide 27 | 750° C. | Natural | o |
| Sulfide 28 | 750° C. | Natural | o |
| Sulfide 29 | 750° C. | Natural | o |
| Sulfide 30 | 750° C. | Natural | o |
| Sulfide 31 | 750° C. | Natural | o |
| Sulfide 32 | 750° C. | Natural | o |
| Sulfide 33 | 750° C. | Natural | o |
| Sulfide 34 | 750° C. | Slow Cooling | x |
| Sulfide 35 | 900° C. | Natural | x |
| Sulfide 36 | 750° C. | Natural | x |
| Sulfide 37 | 750° C. | Natural | x |
| Sulfide 38 | 750° C. | Natural | x |
| Sulfide 39 | 750° C. | Natural | x |

Embodiments 1-36, Embodiments A-I, Comparative Examples 1-2 and Reference Examples 1-3

Using as starting materials component A and component B (sulfide glass) shown in Table 3 below, the composite powder with component B coated on the surface of component A was prepared through mechanical milling treatment using a zirconia ball and container (at normal temperature and normal pressure and under the atmosphere of argon gas).

The starting materials, the preparation ratio of component A and component B and synthesis conditions (acceleration of gravity, and time) used in Embodiments 1-36, Embodiments A-I, Comparative Examples 1-2 and Reference Examples 1-3 are shown in Table 3.

Concerning Embodiments 1-4 and 14-36 using only component B and Comparative Examples 1-2 using only component A, milling treatment was not performed. Regarding Reference Example 1-3, component A and component B were just mixed, and milling treatment was not performed.

The starting material for Embodiment 13 includes not only Si and sulfide 1 but also KB.

TABLE 3

| Sample Name | Starting Material | | A:B:KB (mass %) | Synthesis Conditions | |
|---|---|---|---|---|---|
| | Component A | Component B | | Acceleration of Gravity | Treatment Time |
| Embodiment 1 | — | Sulfide 1 | 0:100:0 | — | — |
| Embodiment 2 | — | Sulfide 2 | 0:100:0 | — | — |
| Embodiment 3 | — | Sulfide 3 | 0:100:0 | — | — |
| Embodiment 4 | — | Sulfide 4 | 0:100:0 | — | — |
| Embodiment 5 | Si | Sulfide 1 | 70:30:0 | 50 G | 1 h |
| Embodiment 6 | Si | Sulfide 1 | 50:50:0 | 50 G | 1 h |
| Embodiment 7 | Si | Sulfide 1 | 30:70:0 | 50 G | 1 h |
| Embodiment 8 | Si | Sulfide 1 | 10:90:0 | 50 G | 1 h |
| Embodiment 9 | SiO | Sulfide 1 | 30:70:0 | 50 G | 1 h |
| Embodiment 10 | Sn | Sulfide 1 | 30:70:0 | 50 G | 1 h |
| Embodiment A | SnO | Sulfide 1 | 30:70:0 | 50 G | 1 h |
| Embodiment B | $SnO_2$ | Sulfide 1 | 30:70:0 | 50 G | 1 h |
| Embodiment C | $SnF_2$ | Sulfide 1 | 30:70:0 | 50 G | 1 h |

TABLE 3-continued

| Sample Name | Starting Material | | A:B:KB (mass %) | Synthesis Conditions | |
| --- | --- | --- | --- | --- | --- |
| | Component A | Component B | | Acceleration of Gravity | Treatment Time |
| Embodiment D | SnCl$_2$ | Sulfide 1 | 30:70:0 | 50 G | 1 h |
| Embodiment E | SnCu | Sulfide 1 | 30:70:0 | 50 G | 1 h |
| Embodiment F | SnNi | Sulfide 1 | 30:70:0 | 50 G | 1 h |
| Embodiment G | Al | Sulfide 1 | 30:70:0 | 50 G | 1 h |
| Embodiment H | Ga | Sulfide 1 | 30:70:0 | 50 G | 1 h |
| Embodiment I | C$_6$ | Sulfide 1 | 30:70:0 | 50 G | 1 h |
| Embodiment 11 | Si | Sulfide 2 | 30:70:0 | 50 G | 1 h |
| Embodiment 12 | Si | Sulfide 3 | 30:70:0 | 50 G | 1 h |
| Embodiment 13 | Si | Sulfide 1 | 25:70:5 | 50 G | 1 h |
| Embodiment 14 | — | Sulfide 11 | 0:100:0 | — | — |
| Embodiment 15 | — | Sulfide 12 | 0:100:0 | — | — |
| Embodiment 16 | — | Sulfide 13 | 0:100:0 | — | — |
| Embodiment 17 | — | Sulfide 14 | 0:100:0 | — | — |
| Embodiment 18 | — | Sulfide 15 | 0:100:0 | — | — |
| Embodiment 19 | — | Sulfide 16 | 0:100:0 | — | — |
| Embodiment 20 | — | Sulfide 17 | 0:100:0 | — | — |
| Embodiment 21 | — | Sulfide 18 | 0:100:0 | — | — |
| Embodiment 22 | — | Sulfide 19 | 0:100:0 | — | — |
| Embodiment 23 | — | Sulfide 20 | 0:100:0 | — | — |
| Embodiment 24 | — | Sulfide 21 | 0:100:0 | — | — |
| Embodiment 25 | — | Sulfide 22 | 0:100:0 | — | — |
| Embodiment 26 | — | Sulfide 23 | 0:100:0 | — | — |
| Embodiment 27 | — | Sulfide 24 | 0:100:0 | — | — |
| Embodiment 28 | — | Sulfide 25 | 0:100:0 | — | — |
| Embodiment 29 | — | Sulfide 26 | 0:100:0 | — | — |
| Embodiment 30 | — | Sulfide 27 | 0:100:0 | — | — |
| Embodiment 31 | — | Sulfide 28 | 0:100:0 | — | — |
| Embodiment 32 | — | Sulfide 29 | 0:100:0 | — | — |
| Embodiment 33 | — | Sulfide 30 | 0:100:0 | — | — |
| Embodiment 34 | — | Sulfide 31 | 0:100:0 | — | — |
| Embodiment 35 | — | Sulfide 32 | 0:100:0 | — | — |
| Embodiment 36 | — | Sulfide 33 | 0:100:0 | — | — |
| Comparative Example 1 | Si | — | 100:0:0 | — | — |
| Comparative Example 2 | C$_6$ | — | 100:0:0 | — | — |
| Reference Example 1 | Si | Sulfide 1 | 70:30:0 | — | — |
| Reference Example 2 | Si | Sulfide 2 | 70:30:0 | — | — |
| Reference Example 3 | Si | Sulfide 3 | 70:30:0 | — | — |

Embodiments 37-41

By heating sulfide 1 (component B) shown in Tables 1 and 2, changing it into the state of melted glass, adding and dispersing component A in it and then cooling it naturally to room temperature, an ingot with component A dispersed in component B was prepared. By crushing the obtained ingot using a stirrer 'Raikai' mill, the composite powder with component B coated on component A was prepared. As a heat treatment condition, sulfide glass was heated up to 750° C. at the heating speed of 20° C./hour and then retained at the same temperature for 12 hours. After that, it was cooled naturally to room temperature.

The starting materials used in Embodiments 37-41 and the preparation ratio of A, B and KB are shown in Table 4 below.

Furthermore, in Embodiments 40, by heating sulfide 1 to 750° C., changing it into the state of melted glass, adding and dispersing component A and KB simultaneously in it and then cooling it naturally to room temperature, an ingot with component A and KB dispersed in component B was prepared.

TABLE 4

| Sample Name | Starting Material | | A:B:KB (mass %) |
|---|---|---|---|
| | Component A | Component B | |
| Embodiment 37 | Si | Sulfide 1 | 70:30:0 |
| Embodiment 38 | Si | Sulfide 1 | 50:50:0 |
| Embodiment 39 | Si | Sulfide 1 | 30:70:0 |
| Embodiment 40 | Si | Sulfide 1 | 5:95:0 |
| Embodiment 41 | Si | Sulfide 1 | 65:30:5 |

Analysis

As a result of measurement of powder particles of negative electrode materials for Embodiments 1-36 using a scanning electron microscope (SEM), 10% or more of particle diameter $D_{50}$ of the primary particles was in the range of 1 μm or less. As a result of measurement of the particle diameter of the secondary particles of the composite powder obtained in Embodiments 5-18 using a laser diffractometry, the percentage of the average secondary particle diameter in the range of 1-15 μm was 95%, and the maximum particle diameter of all the secondary particles was 80 μm or less.

FIG. 1 Shows the CV (Cyclic Voltammetry) Measurement Results of Embodiment 1.

As is known from the CV measurement results shown in FIG. 1, a large reduction peak can be observed around 1 V during initial charge (the process of lithium absorption).

Figure 2:
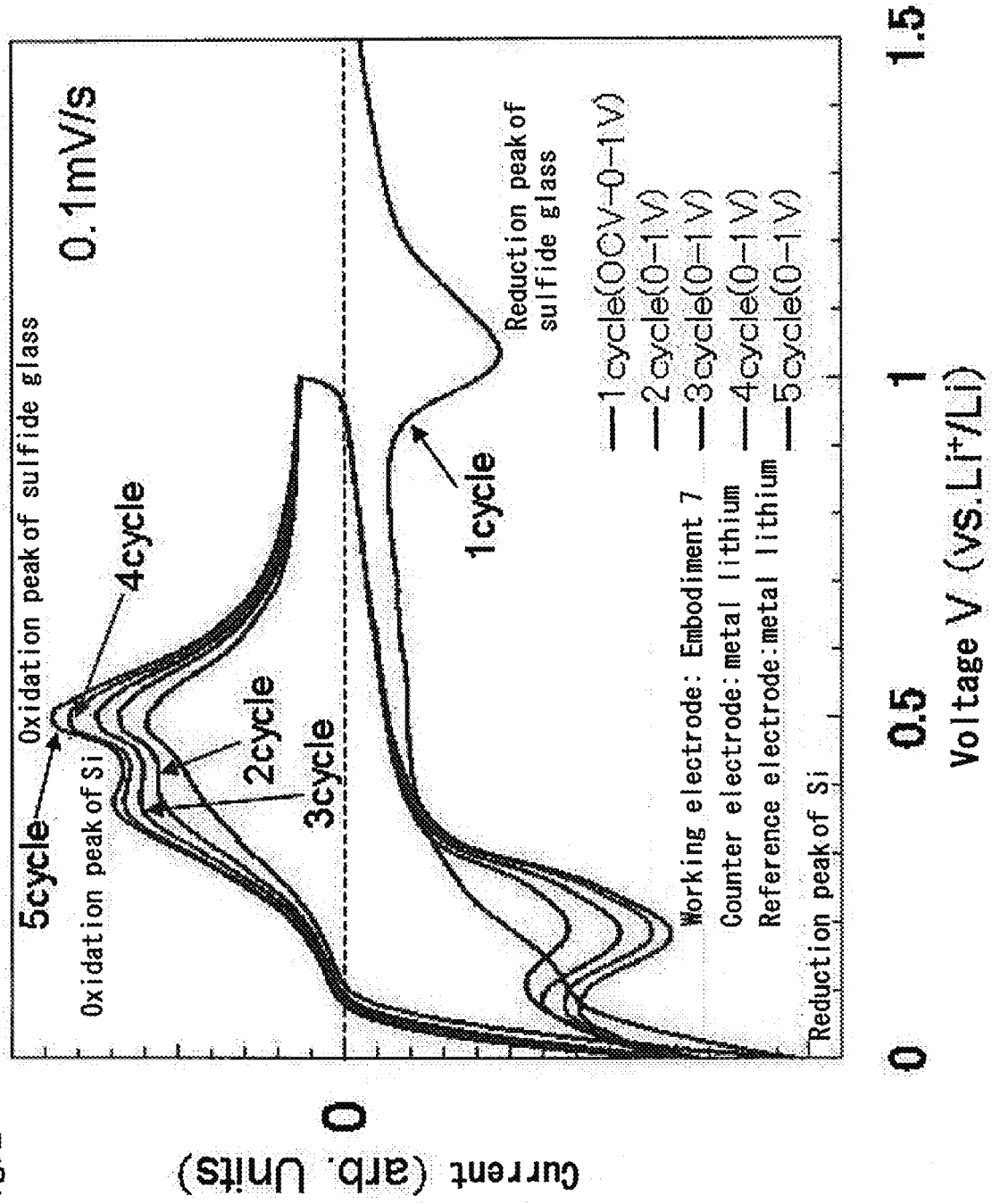
FIG. 2 It is a graph showing the CV measurement results of Embodiment 7.

FIG. 2 Shows the CV Measurement Results of Embodiment 7.

As is known from the CV measurement results shown in FIG. 2, when a composite of Si and sulfide 1 is made, a large reduction peak can also be observed around 1 V during initial charge (the process of lithium absorption).

Therefore, this large reduction peak around 1 V is a reduction peak derived from the sulfide (Embodiment 1), and it is considered to be energy which was used for reducing the sulfur content of Embodiment 1 by lithium and changing it into lithium sulfide. Concerning sulfides 1-33, a large reduction peak was also confirmed around 1 V.

Evaluation of Battery Properties

Using the sulfide glass (a negative electrode material) obtained in Embodiments 1-4 as a negative electrode active substance, a slurry mixture was prepared by mixing a negative electrode active substance: 85 mass %, KB: 5 mass %, CMC binder: 8 mass %, PVA binder: 1 mass % and SBR binder: 1 mass %, and a test electrode (negative electrode) was obtained by applying and drying the mixture on an electrolytic copper foil which was 25 μm in thickness, joining the coating film with the electrolytic copper foil tightly by a roll press machine and then heat-treating it (under reduced pressure, at 135° C. and for an hour or longer).

Using as a counter electrode a metal lithium foil whose capacity was about 50 times as large as the calculated capacity of the test electrode, a glass filter as a separator and a laminate cell (3 cm×3 cm) having $LiPF_6$/PC:DMC (1:1 volume %) of 1 mol/L as electrolytic liquid were prepared.

Using as a negative electrode active substance the composite powder (a negative electrode material) obtained in Embodiments 5-41 and Embodiments A-I and the powder obtained in Comparative Examples 1-2 and Reference Examples 1-3, a slurry mixture was prepared by mixing a negative electrode active substance: 80 mass %, KB: 5 mass % and PI binder: 15 mass %, and a test electrode (negative electrode) was obtained by applying and drying the mixture on an electrolytic copper foil which was 35 μm in thickness, joining the coating film with the electrolytic copper foil tightly by a roll press machine, and then heat-treating it (under reduced pressure, at 265° C. and for an hour or longer).

Using as a counter electrode a metal lithium foil whose capacity was about 50 times as large as the calculated capacity of the test electrode, a glass filter as a separator and a coin cell (CR2032) having $LiPF_6$/EC:DEC (1:1 volume %) of 1 mol/L as electrolytic liquid were prepared.

Evaluation 1: Cycle Life Properties

The test results of charge and discharge of the prepared test cell (a lithium secondary battery) at the rate of 0.5 C are shown in Table 5 below. The capacity density of the negative electrode was 3-4 mAh/cm², and the cutoff potential was set at 0-1 V.

TABLE 5

| | Discharge Capacity of Active Substance (mAh/g) | | |
|---|---|---|---|
| | Initial | $50^{th}$ Cycle | $100^{th}$ Cycle |
| Embodiment 1 | 583 | 560 | 553 |
| Embodiment 2 | 502 | 447 | 435 |
| Embodiment 3 | 441 | 440 | 426 |
| Embodiment 4 | 338 | 317 | 323 |
| Embodiment 5 | 1703 | 1637 | 1494 |
| Embodiment 6 | 1465 | 1423 | 1312 |
| Embodiment 7 | 1369 | 1360 | 1280 |
| Embodiment 8 | 799 | 785 | 772 |
| Embodiment 9 | 900 | 889 | 879 |
| Embodiment 10 | 635 | 633 | 630 |
| Embodiment A | 598 | 595 | 592 |
| Embodiment B | 579 | 576 | 574 |
| Embodiment C | 558 | 551 | 535 |
| Embodiment D | 558 | 555 | 553 |
| Embodiment E | 564 | 560 | 557 |
| Embodiment F | 557 | 553 | 550 |
| Embodiment G | 633 | 699 | 554 |
| Embodiment H | 498 | 494 | 492 |
| Embodiment I | 504 | 501 | 498 |
| Embodiment 11 | 1453 | 1397 | 1200 |
| Embodiment 12 | 1218 | 1210 | 1201 |
| Embodiment 13 | 1643 | 1601 | 1510 |
| Embodiment 14 | 557 | 539 | 533 |
| Embodiment 15 | 450 | 398 | 533 |
| Embodiment 16 | 527 | 518 | 503 |

TABLE 5-continued

Discharge Capacity of Active Substance (mAh/g)

|  | Initial | 50th Cycle | 100th Cycle |
|---|---|---|---|
| Embodiment 17 | 566 | 545 | 541 |
| Embodiment 18 | 540 | 524 | 513 |
| Embodiment 19 | 538 | 516 | 505 |
| Embodiment 20 | 536 | 522 | 515 |
| Embodiment 21 | 489 | 463 | 458 |
| Embodiment 22 | 580 | 565 | 561 |
| Embodiment 23 | 511 | 489 | 477 |
| Embodiment 24 | 526 | 522 | 520 |
| Embodiment 25 | 473 | 463 | 449 |
| Embodiment 26 | 313 | 310 | 307 |
| Embodiment 27 | 343 | 336 | 326 |
| Embodiment 28 | 359 | 352 | 341 |
| Embodiment 29 | 486 | 476 | 461 |
| Embodiment 30 | 521 | 510 | 495 |
| Embodiment 31 | 388 | 380 | 369 |
| Embodiment 32 | 310 | 307 | 304 |
| Embodiment 33 | 616 | 603 | 585 |
| Embodiment 34 | 583 | 572 | 554 |
| Embodiment 35 | 286 | 284 | 284 |
| Embodiment 36 | 486 | 476 | 461 |
| Embodiment 37 | 1782 | 1629 | 1370 |
| Embodiment 38 | 1509 | 1433 | 1296 |
| Embodiment 39 | 1301 | 1280 | 1200 |
| Embodiment 40 | 643 | 640 | 639 |
| Embodiment 41 | 1622 | 1499 | 1287 |
| Comparative Example 1 | 3093 | 43 | 42 |
| Comparative Example 2 | 320 | 317 | 311 |
| Reference Example 1 | 1733 | 506 | 497 |
| Reference Example 2 | 1744 | 513 | 497 |
| Reference Example 3 | 1696 | 425 | 397 |

As is evident from Table 5, each battery with the sulfide glass or composite powder of Embodiments 1-41 and Embodiments A-I as a negative electrode has a high capacity retention rate (the discharge capacity in the 100th cycle/the initial discharge capacity).

Furthermore, Batteries with the composite powder of Embodiments 5-13, 37-41 and Embodiment G as negative electrodes showed high values of the discharge capacity of 600-1700 mAh/g in the 50th cycle. It is also known that each battery with the composite powder of each Embodiment as a negative electrode does not deteriorate easily and has a good capacity retention rate compared to Comparative Example 1. Particularly, Embodiments 5-7, 11-13, 37-39 and 41 showed high values of the discharge capacity of 1200 mAh/g or more in the 100th cycle.

Figure 3:
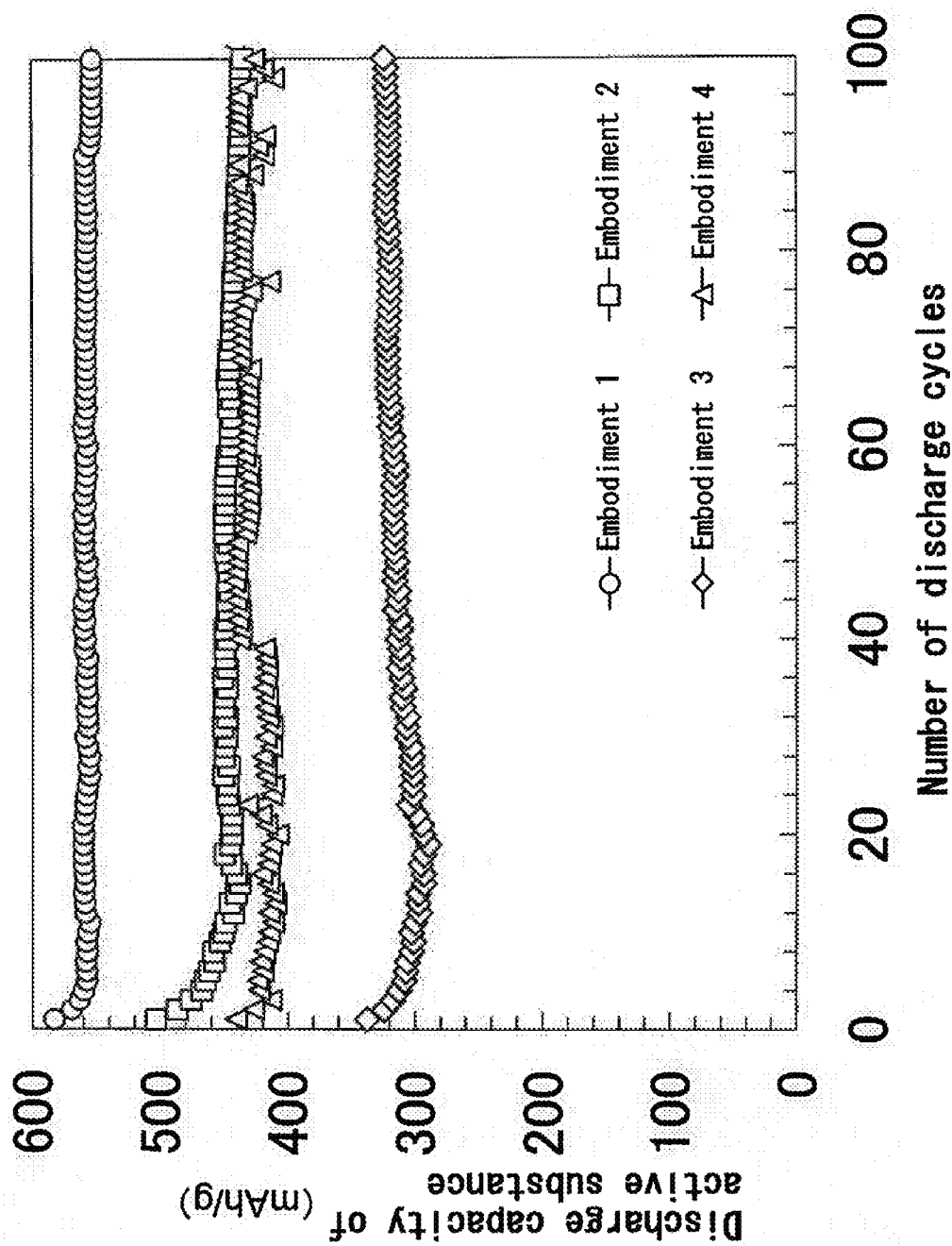
FIG. 3 It is a graph showing the cycle lives of Embodiments 1-4.
Figure 4:
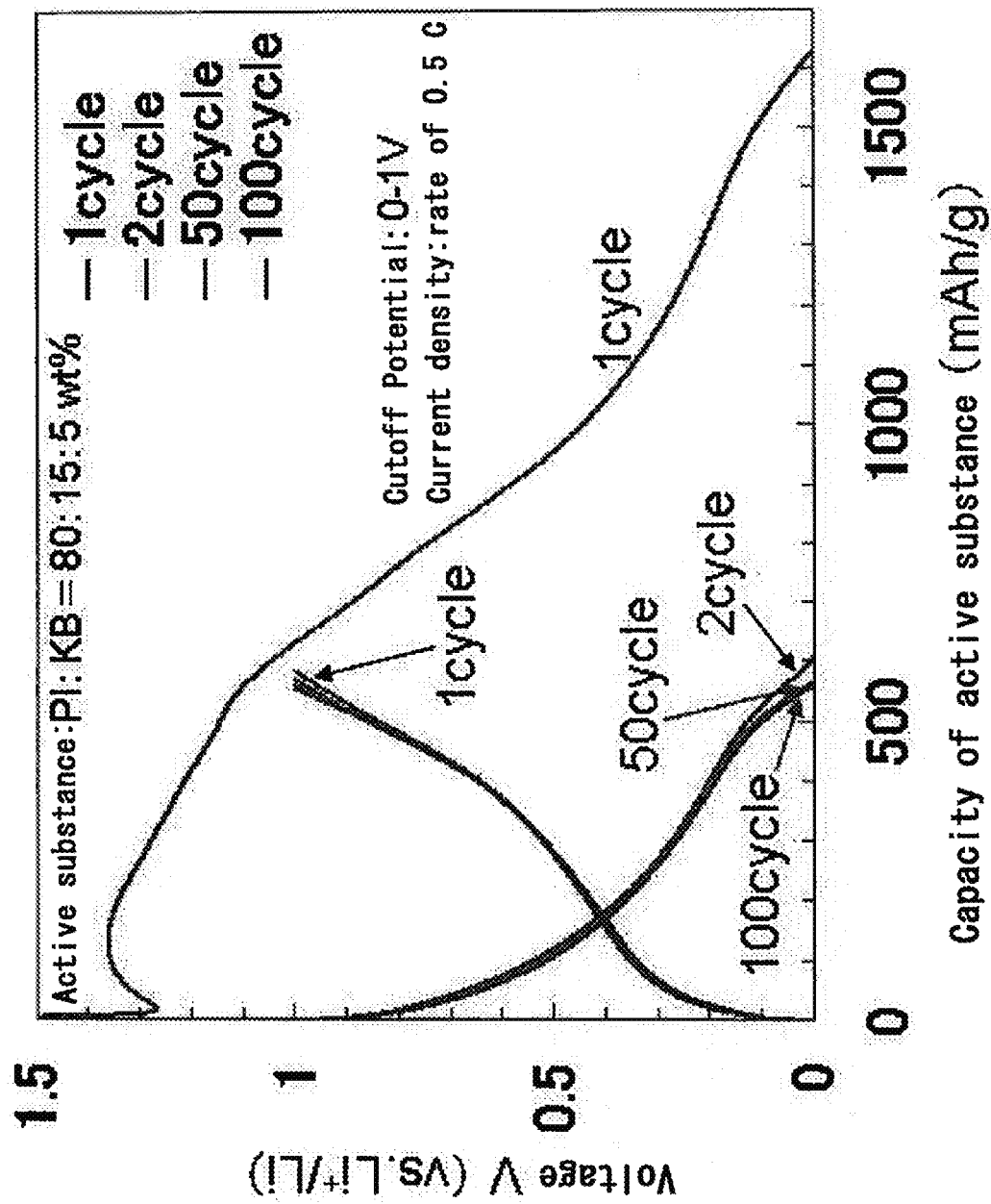
FIG. 4 It is a graph of the charge and discharge curve of Embodiment 1.

As one example, the cycle lives of Embodiments 1-4 are shown in FIG. 3. The charge and discharge curve of Embodiment 1, which exhibited particularly good battery properties among them, is shown in FIG. 4.

Figure 5:
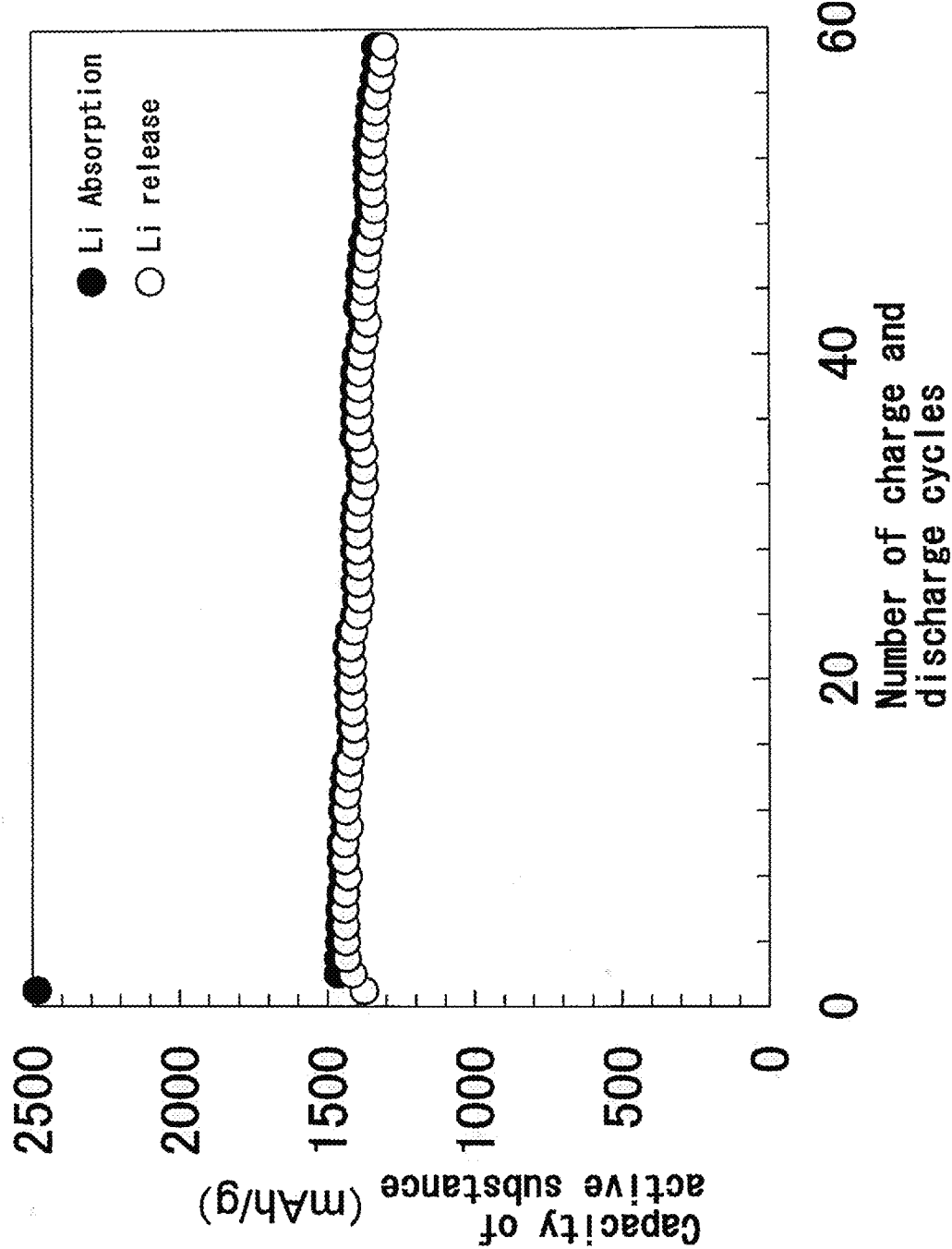
FIG. 5 It is a graph showing the cycle life characteristics of Embodiment 7.
Figure 6:
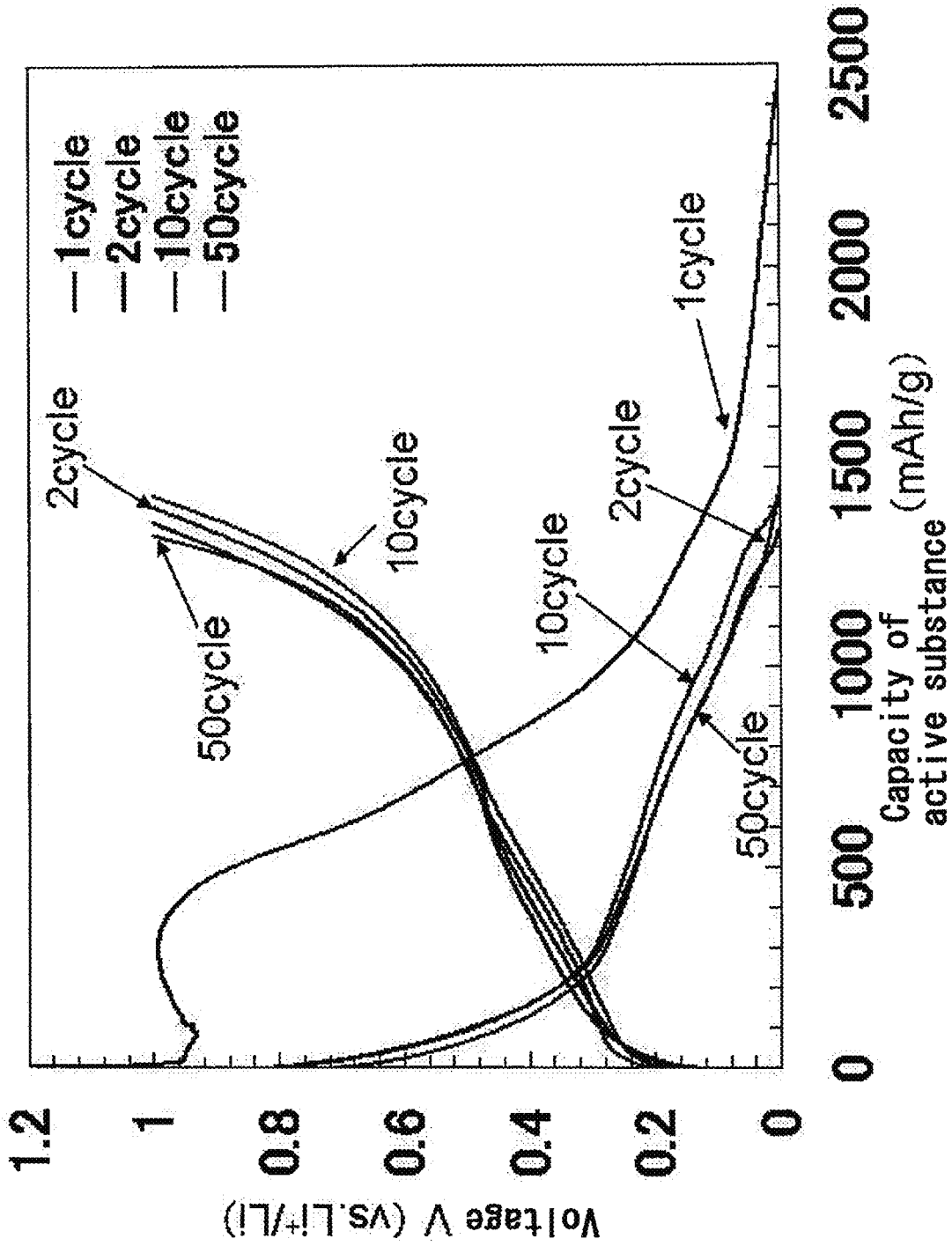
FIG. 6 It is a graph of the charge and discharge curve of Embodiment 7.

The cycle life characteristics of Embodiment 7, which exhibited particularly good battery properties among Embodiments 1-41 and Embodiments A-I, is shown in FIG. 5, and its charge and discharge curve is shown in FIG. 6.

It is also known from Table 5 that if a single metal (Comparative Example 1) or powder which was merely mixed (Reference Examples 1-3) is used as a negative electrode the discharge capacity after the 50th cycle is low, the discharge capacity after the 50th cycle is conspicuously deteriorated (the discharge capacity retention rate in the 100th cycle was 20% or less assuming that the initial discharge capacity was 100%), and the cycle life is not long enough. It is also known that if graphite is used as a negative electrode of an active substance (Comparative Example 2) the discharge capacity and the discharge capacity retention rate in the 100th cycle are good enough, but it does not exhibit a discharge capacity high enough to effectively use the high capacity of Si which is an element reacting electrochemically with lithium (Li).

Figure 7:
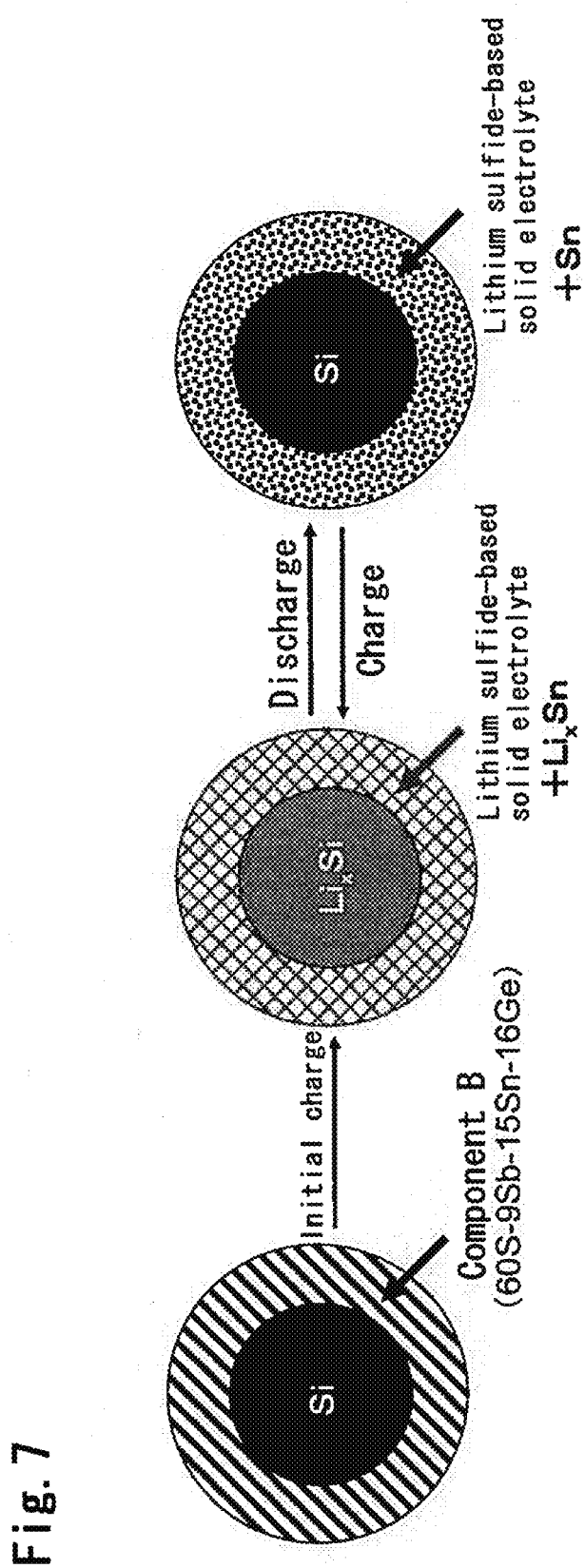
FIG. 7 It is an image figure of the charge and discharge process of Embodiment 7.
Figure 8:
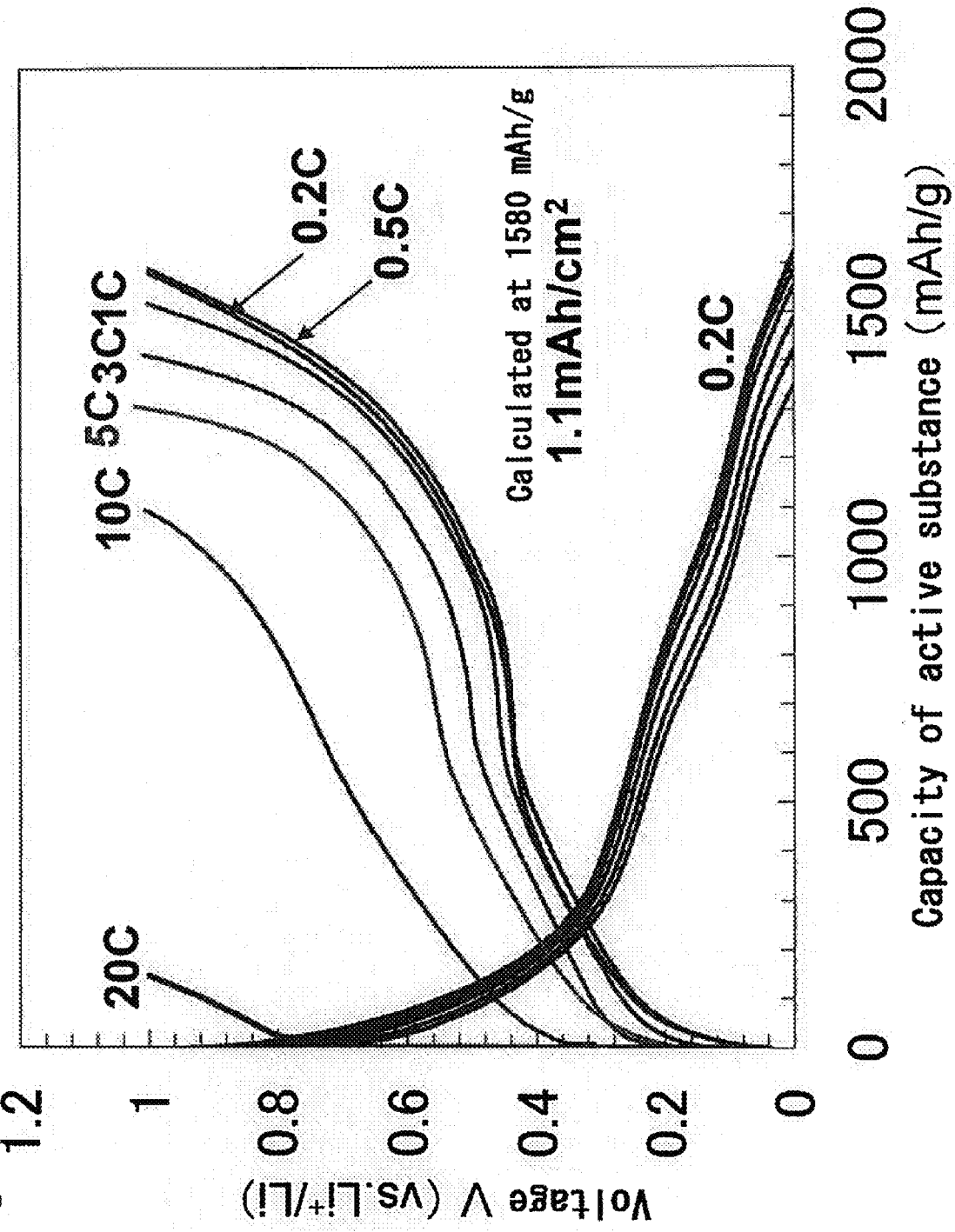
FIG. 8 It is a graph of the high rate charge and discharge curve of Embodiment 7.

As another example, an image figure of a charge and discharge process of the cross section of the negative electrode material according to this invention, which comprises Si as component A and component B1 (60S-9Sb-15Sn-16Ge) as component B, is shown in FIG. 7. As shown in FIG. 7, during initial charge, component A turns into lithium, and the sulfide constituting component B is reduced by lithium and decomposed into $Li_2S$—$GeS_2$—$Sb_2S_3$ and $Li_xSn(x=4.4$ or less). $Li_2S$—$GeS_2$—$Sb_2S_3$ is a solid electrolyte, and since it functions as a buffer layer to volume expansion of Si or Sn the electrolyte has good output characteristics and is not easily deteriorated after repeated charge and discharge.

Evaluation 2: High Rate Discharge Characteristics

Figure 9:
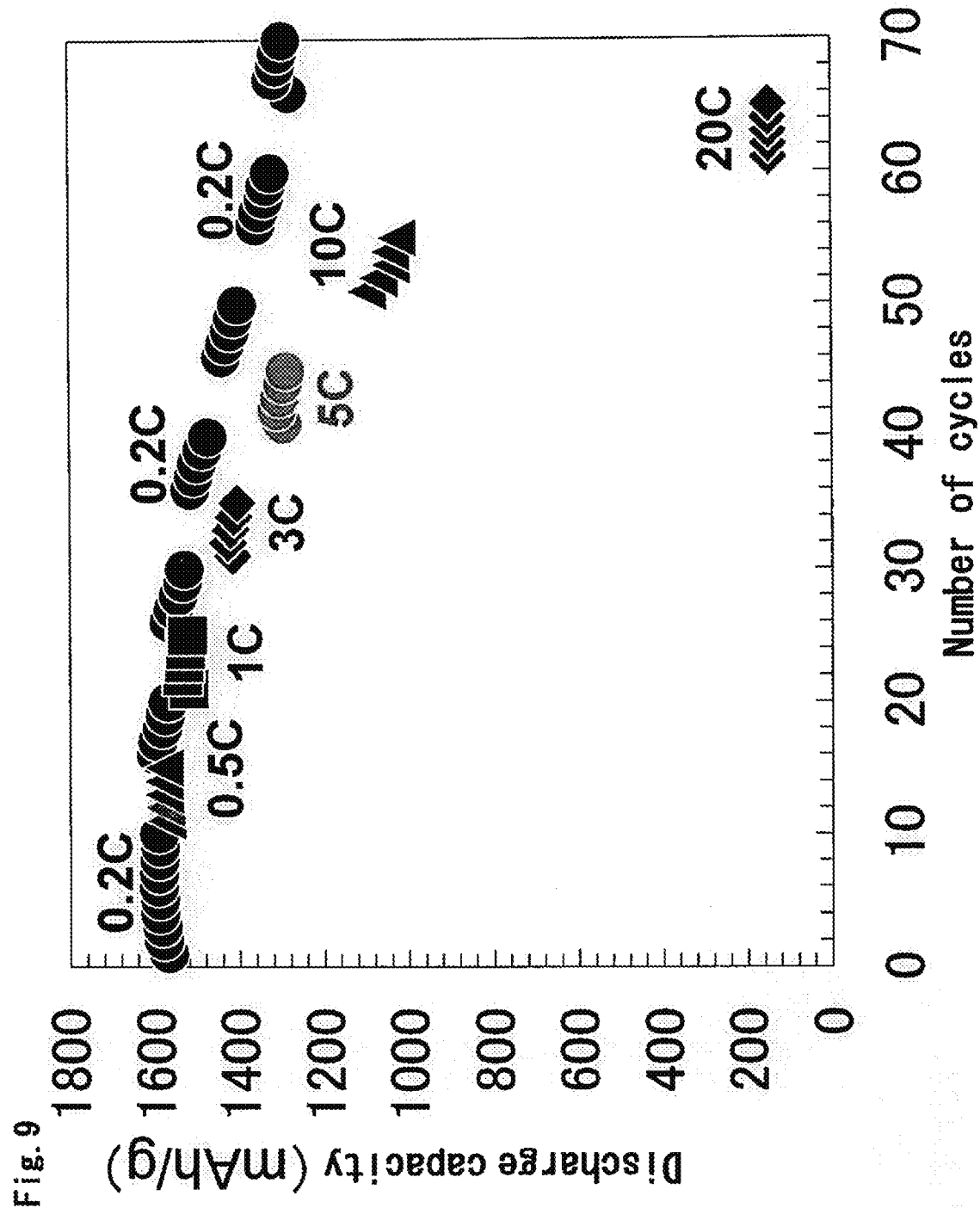
FIG. 9 It is a graph showing the cycle life characteristics of Embodiment 7 during high rate charge and discharge.
Figure 10:
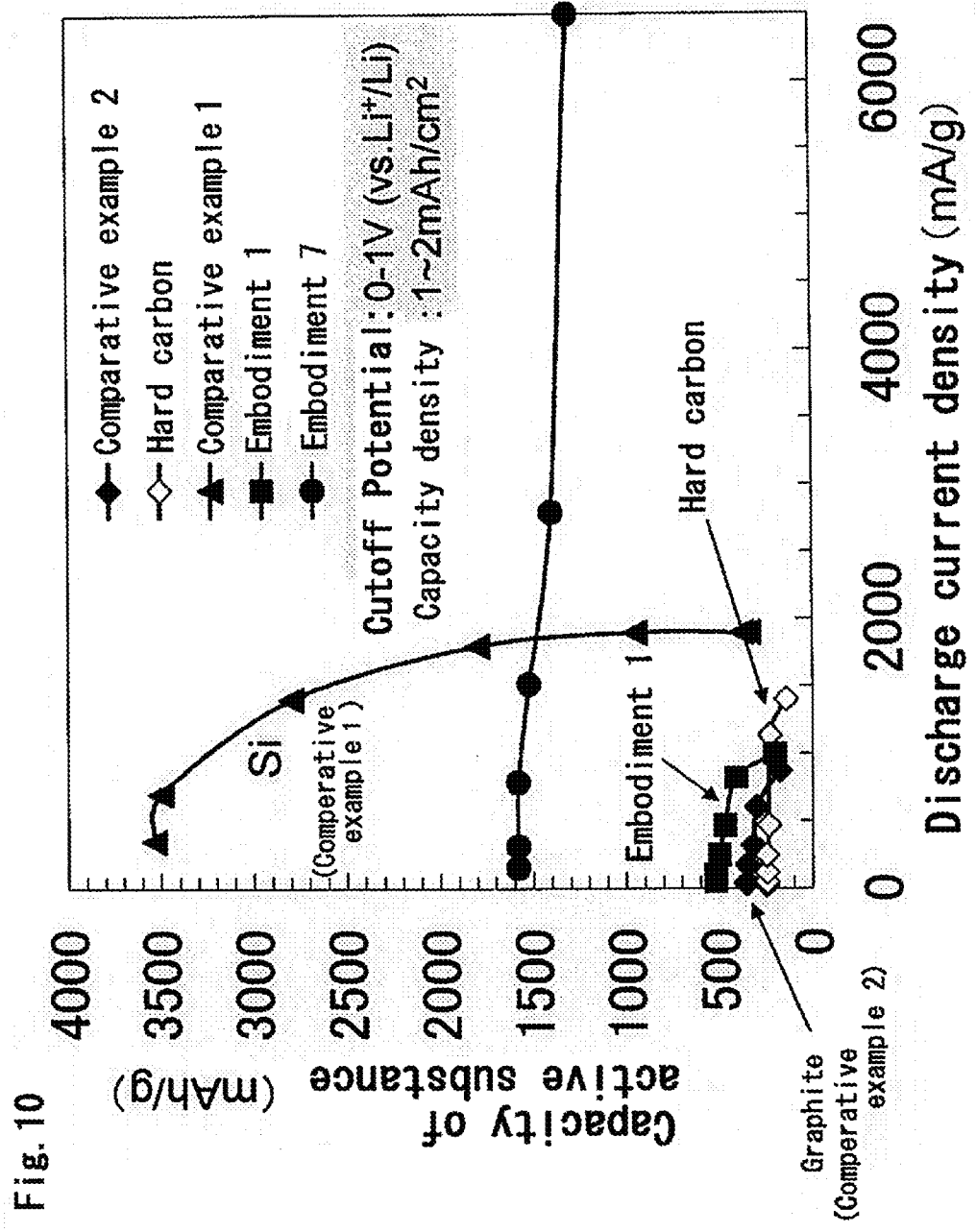
FIG. 10 It is a graph showing the relation in the discharge density of graphite, hard carbon, Embodiment 1 and Embodiment 7.
Figure 11:
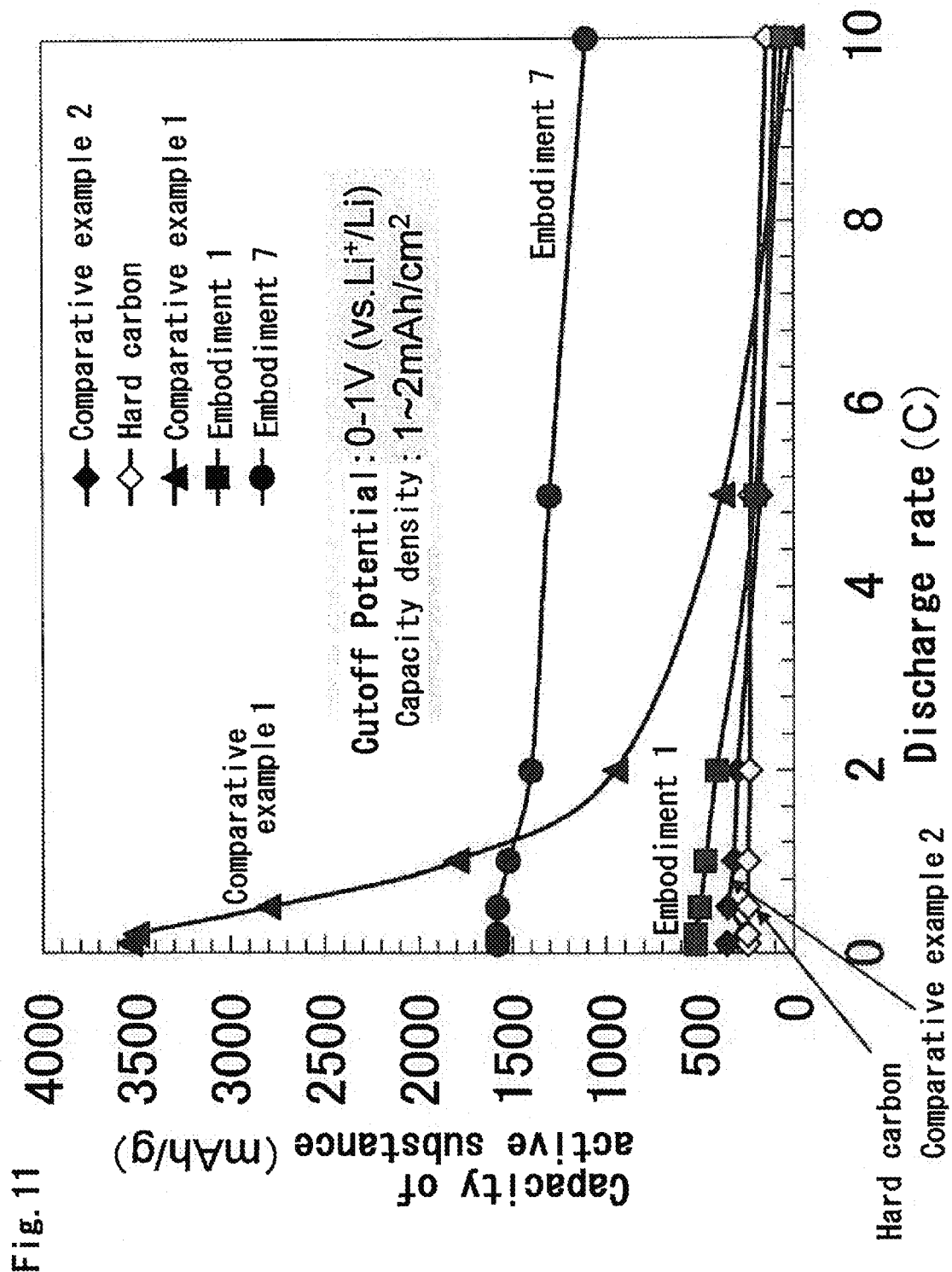
FIG. 11 It is a graph of the comparison of high rate discharge characteristics of graphite, hard carbon, Embodiment 1 and Embodiment 7.

Table 8 shows the high rate charge and discharge curves obtained after the battery using the negative electrode material of Embodiment 7 as a negative electrode was charged at the rate of 0.2 C and then discharged at the specified current, and FIG. 9 shows the cycle life characteristics during high rate charge and discharge. The capacity density of the negative electrode was 1.1 $mAh/cm^2$, and the cutoff potential was set at 0-1 V. The relation in the discharge density between a conventional negative electrode material (graphite and hard carbon) and the negative electrode material according to this invention (Embodiment 1 (component B) and Embodiment 7 (the composite powder of component A and component B)) is shown in FIG. 10. Furthermore, the comparison of high rate discharge characteristics is shown in FIG. 11.

It is known from Table 10 and Table 11 that compared to graphite or hard carbon the discharge current density of Embodiment 1 (component B) in accordance with this invention is high and the discharge current density of Embodiment 7 (the composite powder of component A and component B) in accordance with this invention is even higher.

As is evident from FIGS. 8-11, it is known that a test cell retains the high capacity of more than 1000 mAh/g even at the discharge rate of 10 C and has excellent high rate discharge characteristics.

As is evident from FIGS. 3-4, each test cell (battery) using the negative electrode material of any of Embodiments 1-4 had good cycle life characteristics, and Embodiment 1 exhibited a particularly high capacity.

Furthermore, as is evident from FIGS. 6-9, it is known that the test cell using the negative electrode material of Embodiment 7 retains the high capacity of more than 1300 mAh/g even at the discharge rate of 5 C and enables high rate discharge. Noticeably, it is known that the test cell retains the high capacity of more than 1000 mAh/g even at the discharge rate of 10 C and enables discharge at an extremely high current.

Evaluation 3: Low Temperature Charge Test

The test cells of Embodiments 1-41 were charged to 0 V at the rate of 0.01 C under the atmosphere of the temperature of −5° C. After charged full, the cells were disassembled to remove the negative electrodes, and the negative electrodes were measured by XRD under a dry atmosphere to confirm whether or not metal lithium was precipitated. For comparison, a negative electrode using graphite as an active substance was prepared and charged at low temperature under the same conditions.

As a result of the XRD measurement, concerning the electrodes of Embodiments 1-41 no diffraction peak derived from lithium could be observed, but concerning the electrode using graphite as an active substance a diffraction peak derived from lithium was observed.

Figure 12:
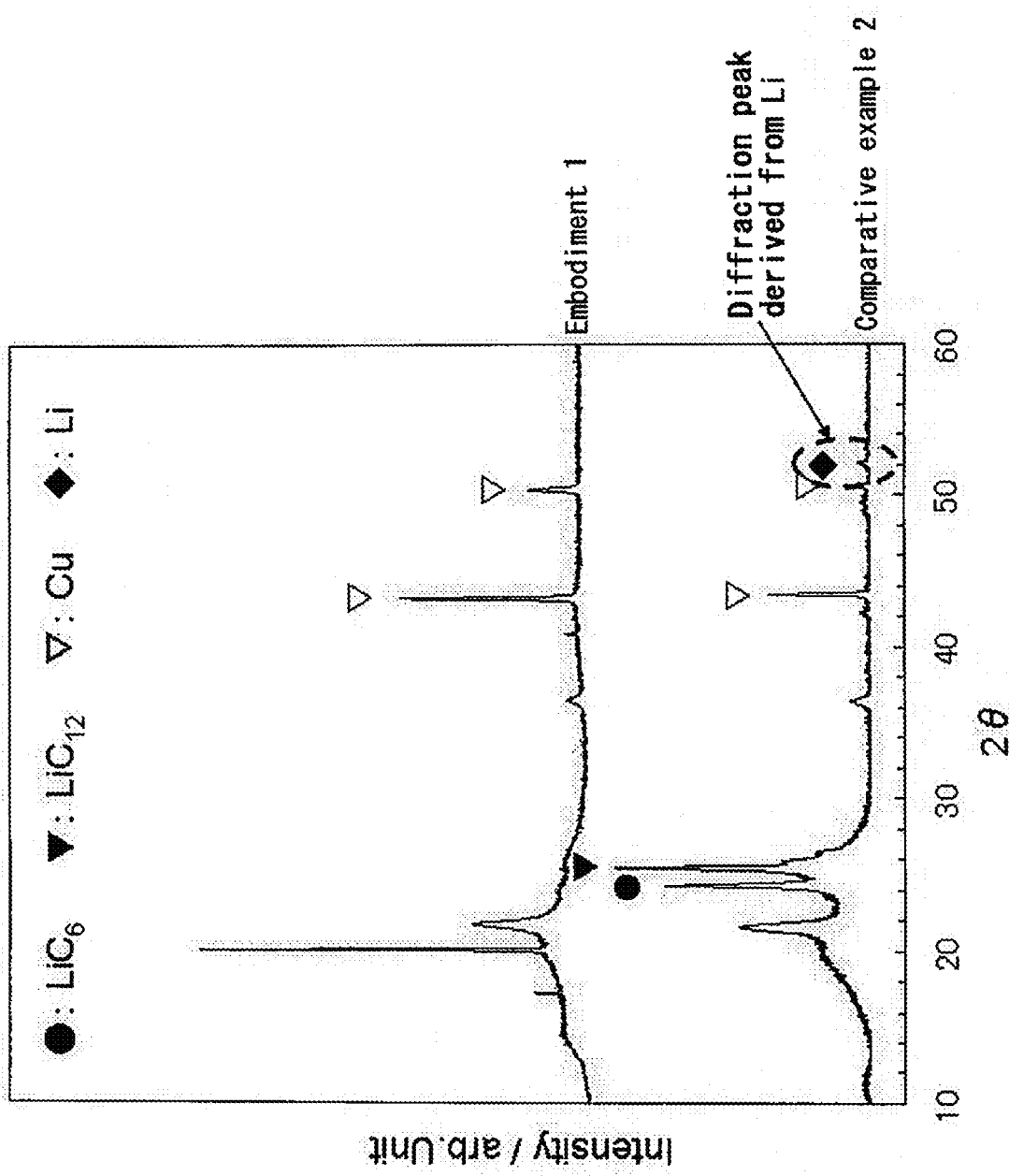
FIG. 12 It is a graph showing the XRD test results of Embodiment 1 and graphite after discharge at low temperature.

As one example, FIG. 12 shows the XRD measurement results of the electrode of Embodiment 1 and the electrode using graphite as an active substance (Comparative Example 2) after the above-described low temperature charge. As is known from FIG. 12, concerning the electrode of Embodiment 1 no diffraction peak derived from lithium can be observed, but concerning the electrode using graphite as an active substance (Comparative Example 2) a diffraction peak derived from lithium can be observed.

As described above, the electrode in accordance with this invention has proved safe with no precipitation of lithium dendrites during low temperature charge.

INDUSTRIAL APPLICABILITY

The lithium secondary battery obtained according to this invention can be used for application in, for example, a main power source of mobile communication equipment, portable electronic devices, electric bicycles, electric two-wheel vehicles, electric automobiles, etc.

The invention claimed is:

1. A negative electrode material for a lithium secondary battery comprising sulfide glass, including sulfur and the following components (i) and (ii):
    (i) at least one or more elements selected from a group consisting of Sb, Bi, Ge, Cu, and Zn; and
    (ii) the element Sn,
    wherein the ratio in said sulfide glass is sulfur: 40-80 mol %, (i): 1-50 mol % and (ii) 1-50 mol %, respectively.

2. The negative electrode material for a lithium secondary battery according to claim 1, wherein said sulfide glass includes 0.5-40 mol % of Ge.

3. A negative electrode material for a lithium secondary battery comprising a composite powder of component A and component B,
    wherein (1) said component A is a material capable of electrochemically absorbing and releasing lithium; and
    (2) said component B is the sulfide glass according to claim 1.

4. The negative electrode material for a lithium secondary battery according to claim 3, wherein said composite powder is a composite powder with component B coated on the surface of component A.

5. The negative electrode material for a lithium secondary battery according to claim 3, wherein regarding the ratio of component A and component B of all said composite powder, component A is 5-80 mass % and component B is 95-20 mass %, given that the total amount of both is 100 mass %.

6. A negative electrode for a lithium secondary battery using the negative electrode material according to claim 1.

7. A negative electrode for a lithium secondary battery using the negative electrode material according to claim 3.

8. The negative electrode for a lithium secondary battery according to claim 6 including a water-based binder.

9. The negative electrode for a lithium secondary battery according to claim 7 including a water-based binder.

10. The negative electrode for a lithium secondary battery according to claim 6 including a polyimide binder.

11. The negative electrode for a lithium secondary battery according to claim 7 including a polyimide binder.

12. A lithium secondary battery using the negative electrode according to claim 6.

13. A lithium secondary battery using the negative electrode according to claim 7.

14. A manufacturing method of the negative electrode material for a lithium secondary battery according to claim 3, the method comprising:
    (A) obtaining component B by preparing the material of component B and by vitrifying the prepared material through heat treatment (temperature: 400-1100° C. and treatment time: 1-30 hours); and
    (B) making a composite of component A and component B.

15. The manufacturing method of the negative electrode material for a lithium secondary battery according to claim 14, wherein said step (B) is a step of making a composite of component A and component B through mechanical milling.

16. The manufacturing method of the negative electrode material for a lithium secondary battery according to claim 14, wherein said step (B) is a step of dispersing component A in melted component B and crushing it after cooling.

17. The manufacturing method of the negative electrode material for a lithium secondary battery according to claim 14, wherein a conductive aid and/or binder is added during said step (A) and/or step (B) and thus the conductive aid and/or binder is included in the composite powder.

18. A negative electrode material for a lithium secondary battery comprising sulfide glass, including sulfur and the following components (i) and (ii):
    i. the element Ge
    ii. at least one or more elements selected from a group consisting of Te, Ga, Sn, Al, Mg, Ca, Sr, P and Ba, wherein the ratio in said sulfide glass is sulfur: 40-80 mol %, (i): 1-50 mol % and (ii) 1-50 mol %, respectively.

19. The negative electrode material for a lithium secondary battery according to claim 18, wherein said sulfide glass includes 0.5-40 mol % of Ge.

20. A negative electrode material for a lithium secondary battery comprising a composite powder of component A and component B, wherein (1) said component A is a material capable of electrochemically absorbing and releasing lithium; and (2) said component B is the sulfide glass according to claim 18.

21. The negative electrode material for a lithium secondary battery according to claim 20, wherein said composite powder is a composite powder with component B coated on the surface of component A.

22. The negative electrode material for a lithium secondary battery according to claim 21, wherein regarding the ratio of component A and component B of all said composite powder, component A is 5-80 mass % and component B is 95-20 mass %, given that the total amount of both is 100 mass %.

23. A negative electrode for a lithium secondary battery using the negative electrode material according to claim 18.

24. A negative electrode for a lithium secondary battery using the negative electrode material according to claim 21.

25. The negative electrode for a lithium secondary battery according to claim 24 including a water-based binder.

26. The negative electrode for a lithium secondary battery according to claim 25 including a water-based binder.

27. The negative electrode for a lithium secondary battery according to claim 24 including a polyimide binder.

28. The negative electrode for a lithium secondary battery according to claim 25 including a polyimide binder.

29. A lithium secondary battery using the negative electrode according to claim 24.

30. A lithium secondary battery using the negative electrode according to claim 25.

31. A manufacturing method of the negative electrode material for a lithium secondary battery according to claim 21, the method comprising:

a. obtaining component B by preparing the material of component B and by vitrifying the prepared material through heat treatment (temperature: 400-1100° C. and treatment time: 1-30 hours); and b. making a composite of component A and component B.

32. The manufacturing method of the negative electrode material for a lithium secondary battery according to claim 31, wherein said step (B) is a step of making a composite of component A and component B through mechanical milling.

33. The manufacturing method of the negative electrode material for a lithium secondary battery according to claim 31, wherein said step (B) is a step of dispersing component A in melted component B and crushing it after cooling.

34. The manufacturing method of the negative electrode material for a lithium secondary battery according to claim 31, wherein a conductive aid and/or binder is added during said step (A) and/or step (B) and thus the conductive aid and/or binder is included in the composite powder.

* * * * *